(12) United States Patent
Mousavi et al.

(10) Patent No.: US 12,146,851 B2
(45) Date of Patent: Nov. 19, 2024

(54) THREAD-BASED POTENTIOMETRIC ION-SENSING

(71) Applicant: President and Fellows of Harvard College, Cambridge, MA (US)

(72) Inventors: Seyedeh Moloud Mousavi, Watertown, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 489 days.

(21) Appl. No.: 16/762,821

(22) PCT Filed: Nov. 13, 2018

(86) PCT No.: PCT/US2018/060823
§ 371 (c)(1),
(2) Date: May 8, 2020

(87) PCT Pub. No.: WO2019/094966
PCT Pub. Date: May 16, 2019

(65) Prior Publication Data
US 2020/0363367 A1    Nov. 19, 2020

Related U.S. Application Data

(60) Provisional application No. 62/585,151, filed on Nov. 13, 2017.

(51) Int. Cl.
*G01N 27/333*   (2006.01)
*D02G 3/40*     (2006.01)
*D02G 3/44*     (2006.01)

(52) U.S. Cl.
CPC .......... *G01N 27/333* (2013.01); *D02G 3/404* (2013.01); *D02G 3/441* (2013.01)

(58) Field of Classification Search
None
See application file for complete search history.

(56) References Cited

U.S. PATENT DOCUMENTS 5,674,752 A    10/1997 Buckley et al.

FOREIGN PATENT DOCUMENTS

WO    WO-2017/189966 A1    11/2017

OTHER PUBLICATIONS

Vojtech et al. ("Wearable Textile Electrodes for ECG Measurement", Biomedical Engineering, vol. 11, No. 5, 2013). (Year: 2013).*

(Continued)

*Primary Examiner* — Shawn Mckinnon
(74) *Attorney, Agent, or Firm* — Wilmer Cutler Pickering Hale and Dorr LLP

(57) ABSTRACT

Fabrication of a low-cost and miniaturized solid-contact thread-based ion sensing electrode (ISE) that is suitable for point-of-care applications is described. The fabrication process is simple and scalable. Different types of threads and a variety of different conductive ion-to-electron transducer inks can be used to fabricate the thread-based ISEs with Nernstian responses. Multiple thread-based sensors can be easily bundled with the reference electrode to fabricate a customized sensor for multiplexed ion-sensing in small sample volumes. The thread-based electrodes can be used in both single-use and reusable fashion. The thread-based multiplexed ion-sensor is used for detection of a wide array of ions in many different types of aqueous solutions.

22 Claims, 21 Drawing Sheets

(56) References Cited

OTHER PUBLICATIONS

Decorwin-Martin ("String Microfluidics", McGill University, Thesis, 2014) (Year: 2014).*
"Dioctyl sebacate," Wikipedia, May 31, 2017. 2 pages. (https://en.wikipedia.org/w/index.php?title=Dioctyl_sebacate&oldid+783220310).
Abbott, iStat System. 4 pages. Accessed Aug. 28, 2017. (https://www.pointofcare.abbott/us/en/offerings/istat).
Agustini et al., "Low cost microfluidic device based on cotton threads for electroanalytical application," Lab on a Chip (2016), published online Nov. 27, 2015, vol. 16, pp. 345-352.
Armas et al., "Ready-to-use single-strip paper based sensor for multiplex ion detection," Sensors and Actuators B: Chemical (2018), available online Sep. 9, 2017, vol. 255, pp. 1781-1787.
Bakker et al., "The New Wave of Ion-Selective Electrodes," Analytical Chemistry, Aug. 1, 2002, vol. 74(15), pp. 420A-426A.
Bakker, "Hydrophobic Membranes as Liquid Junction-Free Reference Electrodes," Electroanalysis, Jul. 1999, vol. 11, pp. 788-792.
Bobacka et al., "Solid-contact ion-selective electrodes for aromatic cations based on pi-coordinating soft carriers," Talanta, Aug. 23, 2002, vol. 58, pp. 341-349.
Borchardt et al., "Disposable ion-selective electrodes," Sensors and Actuators B: Chemical, Apr. 1995, vol. 25, pp. 721-723.
Buck, "Ion-Selective Electrodes," Analytical Chemistry, Apr. 1978, vol. 50, No. 5, pp. 17R-29R.
Buhlmann et al., "Carrier-Based Ion-Selective Electrodes and Bulk Optodes. 2. Ionophores for Potentiometric and Optical Sensors," Chemical Reviews, Jun. 4, 1998, vol. 98(4), pp. 1593-1687.
Buhlmann et al., "Ion-Selective Electrodes With Ionophore-Doped Sensing Membranes," Supramolecular Chemistry: From Molecules to Nanomaterials, John Wiley & Sons Ltd, Chichester, UK, Mar. 15, 2012, vol. 5, pp. 2539-2579.
Can the Chloride QuanTab test strips be used in soil? HACH Support. Accessed Apr. 10, 2018. 1 page. (https://support.hach.com/app/answers/answer_view/a_id/1008970/~/can-the-chloride-quantab%C2%AE-test-strips-be-used-in-soil%3F).
Carrilho et al., "Understanding Wax Printing: A simple Micropatterning Process for Paper-Based Microfluidics," Analytical Chemistry, Aug. 15, 2009, vol. 81, pp. 7091-7095.
Chloride QuanTab Test Strips, HACH. Accessed Apr. 10, 2018. 1 page. (https://www.hach.com/chloride-quantab-test-strips-30-600-mg-l/product?id=7640211602).
Cicmil et al., "Ionic Liquid-Based, Liquid-Junction-Free Reference Electrode," Electroanalysis, Jun. 7, 2011, vol. 23(8), pp. 1881-1890.
Crespo et al., "Ion-Selective Electrodes Using Carbon Nanotubes as Ion-to-Electron Transducers," Analytical Chemistry, Feb. 15, 2008, vol. 80, No. 4, pp. 1316-1322.
Dryden et al., "DStat: A Versatile, Open-Source Potentiostat for Electroanalysis and Integration," PLOS ONE, Oct. 28, 2015, vol. 10:e0140349. 11 pages.
Dumschat et al., "Potentiometric test strip," Sensors and Actuators B: Chemical, Mar. 1995, vol. 24, pp. 279-281.
Eggenstein et al., "Potentiometric biosensor in double matrix membrane technology," Biosensors & Bioelectronics 1995, vol. 10, pp. 595-600.
Fierke et al., "Effects of Architecture and Surface Chemistry of Three-Dimensionally Ordered Macroporous Carbon Solid Contacts on Performance of Ion-Selective Electrodes," Analytical Chemistry, Jan. 15, 2010, vol. 82, pp. 680-688.
Fixen, "Crop Responses to Chloride," Advances in Agronomy, vol. 50, Academic Press Inc., San Diego, 1993, vol. 50, pp. 107-150. (49 pages). (https://www.sciencedirect.com/science/article/abs/pii/S0065211308608330).
Glavan et al., "Electroanalytical devices with pins and thread," Lab on a Chip, Jan. 7, 2016, vol. 16, pp. 112-119.
Gong et al. "Turning the Page: Advancing Paper-Based Microfluidics for Broad Diagnostic Application," Chemical Reviews, Jun. 19, 2017, vol. 117, pp. 8447-8480.
Guinovart et al., "Potentiometric sensors using cotton yarns, carbon nanotubes and polymeric membranes," Analyst, Sep. 21, 2013, vol. 138, pp. 5208-5215.
Hanrahan et al., "Electrochemical sensors for environmental monitoring: design, development and applications," Journal of Environmental Monitoring, Jun. 28, 2004, vol. 6, pp. 657-664. 8 pages.
Hernandez et al., "Determination of calcium ion in sap using carbon nanotube-based ion-selective electrodes," Analyst, Jun. 7, 2010, vol. 135, pp. 1979-1985.
Hu et al., "A Disposable Planar Paper-Based Potentiometric Ion-Sensing Platform," Angewandte Chemie, International Edition, published online May 13, 2016, vol. 55, pp. 7544-7547.
Hu et al., "All-Solid-State Reference Electrodes Based on Colloid-Imprinted Mesoporous Carbon and Their Application in Disposable Paper-based Potentiometric Sensing Devices," Analytical Chemistry, Jan. 29, 2015, vol. 87, pp. 2981-2987. (https://pubs.acs.org/doi/10.1021/ac504556s).
Hu et al., "Ion-selective electrodes with colloid-imprinted mesoporous carbon as solid contact," Analytical Chemistry, Jul. 1, 2014, vol. 86, pp. 7111-7118. (https://pubmed.ncbi.nlm.nih.gov/24983327/).
Hu et al., "Rational design of all-solid-state ion-selective electrodes and reference electrodes," TrAC, Trends in Analytical Chemistry, Feb. 2016, vol. 76, pp. 102-114. (https://www.sciencedirect.com/science/article/abs/pii/S0165993615301230).
Hulanicki et al., "Calcium-Selective Electrodes with PVC Membranes and Solid Internal Contacts," Analytica Chimica Acta (1976), vol. 87, pp. 411-417.
International Search Report and Written Opinion mailed Feb. 4, 2019, in the International Application No. PCT/US18/60823. 17 pages.
Inzelt et al., Handbook of Reference Electrodes; Springer, New York, NY, 2013 edition (Apr. 30, 2013). 351 pages.
Jaworska et al., "Gold nanoparticles solid contact for ion-selective electrodes of highly stable potential readings," Talanta, available online Jul. 19, 2011, vol. 85, pp. 1986-1989.
Jeanneret et al., "GalvaPot, a custom-made combination galvanostat/potentiostat and high impedance potentiometer for decentralized measurements of ionophore-based electrodes," Sensors and Actuators B: Chemical, Feb. 2015, vol. 207, pp. 631-639.
Jones, Laboratory Guide for Conducting Soil Tests and Plant Analysis, CRC Press, New York, NY, Jun. 28, 2001. 381 pages.
Kakiuchi et al., "New class of Ag/AgCl electrodes based on hydrophobic ionic liquid saturated with AgCl," Analytical Chemistry, Sep. 15, 2007, vol. 79(18), pp. 7187-7191.
Kakiuchi et al., "Phase-boundary potential across the nonpolarized interface between the room-temperature molten salt and water," Electrochemistry Communications, Feb. 2003, vol. 5, pp. 159-164.
Kaushal et al., "Increased salinization of fresh water in the northeastern United States," Proceedings of the National Academy of Sciences, Sep. 20, 2005, vol. 102(38), pp. 13517-13520.
Kisiel et al., "All-solid-state reference electrodes based on conducting polymers," Analyst, Oct. 27, 2005, vol. 130, pp. 1655-1662.
Koryak et al., "Highway Deicing Salt Runoff Events and Major Ion Concentrations along a Small Urban Stream," Journal of Freshwater Ecology, Mar. 2001, vol. 16, pp. 125-134.
Kulpmann, "Influence of Protein on the Determination of Sodium, Potassium and Chloride in Serum," J. Clin. Chem. Clin. Biochem. Oct. 1989, vol. 27, pp. 815-824.
Lan et al., "Paper-Based Potentiometric Ion Sensing," Analytical Chemistry, Sep. 8, 2014, vol. 86, pp. 9548-9553.
Ledford et al., "Floodplain connection buffers seasonal changes in urban stream water quality," Hydrological Processes (2015), published online May 7, 2014, vol. 29, pp. 1002-1016.
Lee et al., "Methods for Measuring Total Organic Chloride Concentrations in Soil as Inorganic Chloride Concentrations Using UV Irradiation and Ion Chromatography," Microchemical Journal, Sep. 1999, vol. 63, 187-195.
Li et al., "Thread as a Versatile Material for Low-Cost Microfluidic Diagnostics," ACS Applied Materials & Interfaces (2010), published online Dec. 9, 2009, vol. 2, pp. 1-6.
Lu et al., "A siphonage flow and thread-based low-cost platform enables quantitative and sensitive assays," Lab on a Chip (2015), published online Nov. 6, 2014, vol. 15, pp. 495-503.

(56) References Cited

OTHER PUBLICATIONS

Luppa et al., "Clinically relevant analytical techniques, organizational concepts for application and future perspectives of point-of-care testing," Biotechnology Advances, published online Jan. 22, 2016, vol. 34, pp. 139-160.
Malinowska et al., "Influence of Nonionic Surfactants on the Potentiometric Response of Ion-Selective Polymeric Membrane Electrodes Designed for Blood Electrolyte Measurements," Analytical Chemistry, Mar. 6, 1998, vol. 70, pp. 1477-1488.
Martinez et al., "Diagnostics for the Developing World: Microfluidic Paper-Based Analytical Devices," Analytical Chemistry, Jan. 2010, vol. 82, pp. 3-10.
Mattinen et al., "Solid-Contact Reference Electrodes Based on Lipophilic Salts," Electroanalysis, Sep. 2009, vol. 21, pp. 1955-1960.
Mensah et al., "Nanomolar Detection Limits of Cd2+, Ag+, and K+ Using Paper-Strip Ion-Selective Electrodes," Analytical Chemistry, Jul. 15, 2014, vol. 86, pp. 7269-7273.
Michalska et al., "Lowering the Detection Limit of Ion-Selective Plastic Membrane Electrodes with Conducting Polymer Solid Contact and Conducting Polymer Potentiometric Sensors," Analytical Chemistry, Aug. 30, 2003, vol. 75, pp. 4964-4974.
Miro et al., "A novel flow-through microdialysis separation unit with integrated differential potentiometric detection for the determination of chloride in soil samples," Analyst, Sep. 23, 2003, vol. 128, pp. 1291-1297. 7 pages.
Mousavi et al., "Avoiding Errors in Electrochemical Measurements: Effect of Frit Material on the Performance of Reference Electrodes with Porous Frit Junctions," Analytical Chemistry, Jul. 28, 2016, vol. 88, pp. 8706-8713.
Mousavi et al., "Ion sensing with thread-based potentiometric electrodes," Lab on a Chip, Jul. 3, 2018, vol. 18, pp. 2279-2290.
Mousavi et al., "Reference Electrodes with Salt Bridges Contained in Nanoporous Glass: An Underappreciated Source of Error," Analytical Chemistry, Sep. 4, 2013, vol. 85, pp. 8895-8901.
Nemiroski et al., "Universal mobile electrochemical detector designed for use in resource-limited applications," PNAS, Aug. 19, 2014, vol. 111, pp. 11984-11989.
Nie et al., "Electrochemical sensing in paper-based microfluidic devices," Feb. 21, 2010, Lab on a Chip 2010, 10, 477-483.
Nishi et al., "Use of Highly Hydrophobic Ionic Liquids for Ion-selective Electrodes of the Liquid Membrane Type," Analytical Sciences, Oct. 2008, vol. 24, pp. 1315-1320.
Novell et al., "A paper-based potentiometric cell for decentralized monitoring of Li levels in whole blood," Lab on a Chip (2014), available online Dec. 3, 2013, vol. 14, pp. 1308-1314.
Novell et al., "Paper-Based Ion-Selective Potentiometric Sensors," Analytical Chemistry, Apr. 23, 2012, vol. 84, pp. 4695-4702.
Oesch et al., "Life time of neutral carrier based ion-selective liquid-membrane electrodes," Analytical Chemistry, Apr. 1980, vol. 52, pp. 692-700.
Paczosa-Bator, "All-solid-state selective electrodes using carbon black," Talanta, online Feb. 11, 2012, vol. 93, pp. 424-427.
Raven, "Chloride: essential micronutrient and multifunctional beneficial ion," Journal of Experimental Botany (2017), advance access publication Dec. 31, 2016, vol. 68, pp. 359-367.
Reches et al. "Thread as a Matrix for Biomedical Assays," ACS Applied Materials & Interfaces, May 24, 2010, vol. 2, 1722-1728.
Rius-Ruiz et al., "Potentiometric Strip Cell Based on Carbon Nanotubes as Transducer Layer: Toward Low-Cost Decentralized Measurements," Analytical Chemistry, Oct. 1, 2011, vol. 83, pp. 8810-8815.
Rowe et al., "CheapStat: An Open-Source, "Do-it-Yourself" Potentiostat for Analytical and Educational Applications," PLOS ONE, Sep. 2011, vol. 6, e23783. 7 pages.
Ruecha et al., "Fully Inkjet-Printed Paper-Based Potentiometric Ion-Sensing Devices," Analytical Chemistry, Aug. 29, 2017, vol. 89, pp. 10608-10616.
Sekar et al., "Simple thick-film thread-based voltammetric sensors," Electrochemistry Communications, Online Jul. 10, 2014, vol. 46, pp. 128-131.
Selmer-Olsen et al., "Determination of Chloride in Aqueous Soil Extracts and Water Samples by Means of a Chloride-selective Electrode," Analyst, Jun. 1973, vol. 98, pp. 412-415.
Sjoberg et al., "Paper-based potentiometric ion sensors constructed on ink-jet printed gold electrodes," Sensors and Actuators B: Chemical (2016), available online Oct. 19, 2015, vol. 224, pp. 325-332.
Szucs et al., "Towards Protein Assays on Paper Platforms with Potentiometric Detection," Electroanalysis (2012), Dec. 13, 2011, vol. 24, pp. 146-152.
Tarabella et al., "A single cotton fiber organic electrochemical transistor for liquid electrolyte saline sensing," Journal of Materials Chemistry, Sep. 27, 2012, vol. 22, pp. 23830-23834.
Vanamo et al., "Electrochemical control of the standard potential of solid-contact ion-selective electrodes having a conducting polymer as ion-to-electron transducer," Electrochimica Acta (2014), available online Nov. 6, 2013, vol. 122, pp. 316-321.
Vanamo et al., "Instrument-Free Control of the Standard Potential of Potentiometric Solid-Contact Ion-Selective Electrodes by Short-Circuiting with a Conventional Reference Electrode," Analytical Chemistry, Oct. 4, 2014, vol. 86, pp. 10540-10545.
Vazquez et al., "Influence of oxygen and carbon dioxide on the electrochemical stability of poly(3,4-ethylenedioxythiophene) used as ion-to-electron transducer in all-solid-state ion-selective electrodes," Sensors and Actuators B: Chemical (2002), vol. 82, p. 7-13.
Vazquez et al., "Solution-cast films of poly(3,4-ethylenedioxythiophene) as ion-to-electron transducers in all-solid-state ion-selective electrodes," Sensors and Actuators B: Chemical, Feb. 2004, vol. 97, pp. 182-189.
Walter, "Dry reagent chemistries in clinical analysis," Analytical Chemistry, Apr. 1983, vol. 55, pp. 498A-514A.
World Health Organization, Guidelines for drinking-water quality, Health criteria and other supporting information, 2 ed., Geneva 1996. 990 pages.
Xu et al., "Advances in Chloride Nutrition of Plants," Advances in Agronomy, Academic Press, Boston, vol. 68, Dec. 16, 1999, pp. 97-150. (58 pages).
Yang et al., "Multiple enzyme-doped thread-based microfluidic system for blood urea nitrogen and glucose detection in human whole blood," Biomicrofluidics, published online Mar. 20, 2015, vol. 9:022402. 12 pages.
Yang et al., "Thread-based microfluidic system for detection of rapid blood urea nitrogen in whole blood," Microfluidics and Nanofluidics, Jan. 25, 2014, vol. 16, pp. 887-894.
Yetisen et al., "Paper-based microfluidic point-of-care diagnostic devices," Lab on a Chip, May 8, 2013, vol. 13, pp. 2210-2251.
Yuan et al., "All-Solid-State Potentiometric Sensors with a Multiwalled Carbon Nanotube Inner Transducing Layer for Anion Detection in Environmental Samples," Analytical Chemistry, Aug. 14, 2015, vol. 87, pp. 8640-8645.
Zhang et al., "Advantages and Limitations of Reference Electrodes with an Ionic Liquid Junction and Three-Dimensionally Ordered Macroporous Carbon as Solid Contact," Analytical Chemistry, Aug. 17, 2012, vol. 84, pp. 7771-7778.
Zou et al., "Solid Contact Ion-Selective Electrodes with a Well-Controlled Co(II)/Co(III) Redox Buffer Layer," Analytical Chemistry, Sep. 2, 2013, vol. 85, pp. 9350-9355.

* cited by examiner

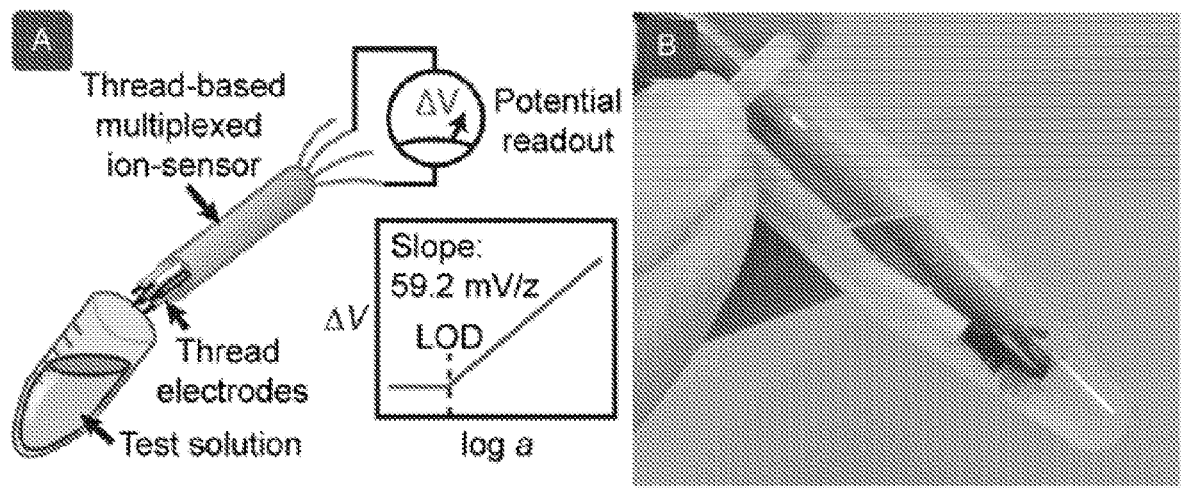
FIG. 5A                    FIG. 5B

FIG. 10A
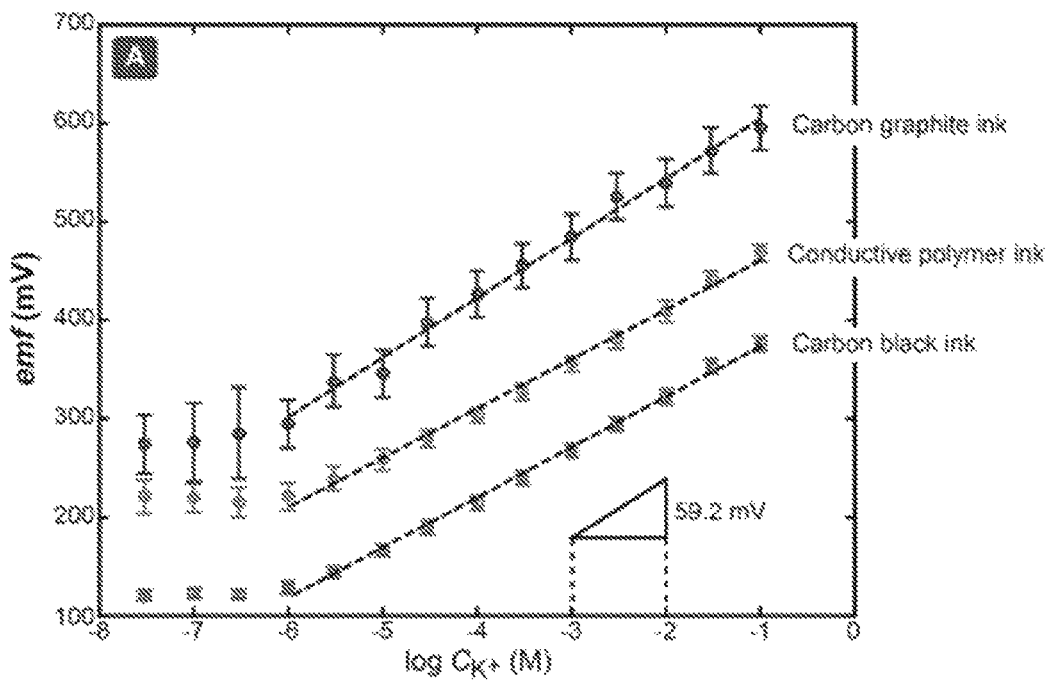
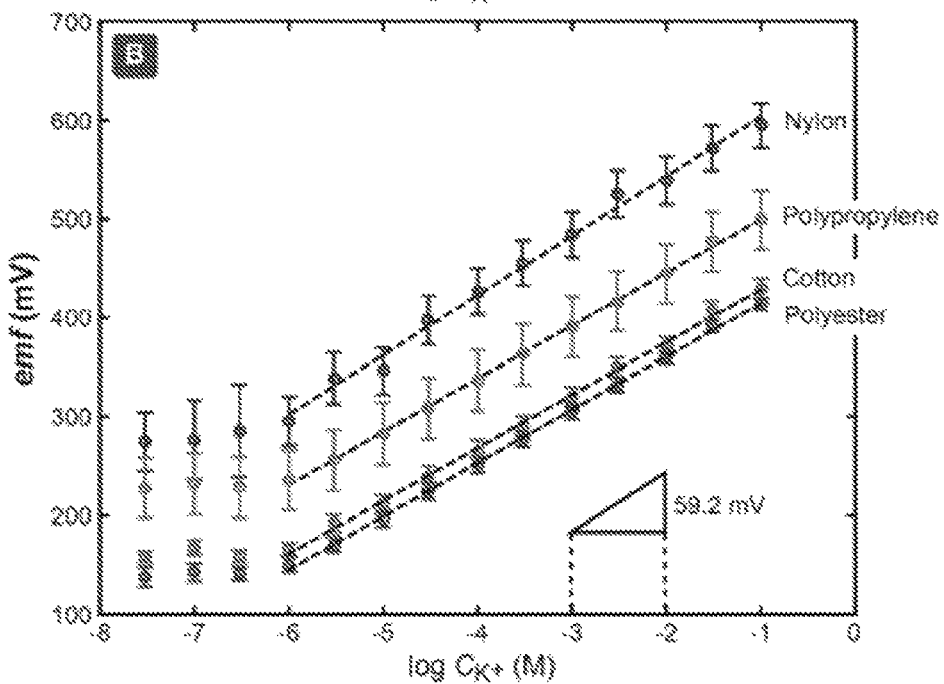
FIG. 10B

THREAD-BASED POTENTIOMETRIC ION-SENSING

CROSS REFERENCE TO RELATED APPLICATION

This application is a U.S. National Stage Application under 35 U.S.C. § 371 of International Patent Application No. PCT/US2018/060823, filed on Nov. 13, 2018, which claims priority to and the benefit of U.S. Provisional Application 62/585,151, filed Nov. 13, 2017, the contents of which are hereby incorporated by reference.

GOVERNMENT SUPPORT

This invention was made with government support under 1420570 awarded by the National Science Foundation. The government has certain rights in the invention.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

The present disclosure relates to sensing of ions.

BACKGROUND

Sensing of ions is a part of management of healthcare, water, the environment, and a range of industrial activities (e.g., in agriculture, food processing, and process control). For example, often in healthcare, the concentrations of electrolytes present in blood serum ($Na^+$, $K^+$, $Ca^{2+}$, $Mg^{2+}$, and $Cl^-$) need to be determined. Potentiometry is a technique used in research and test laboratories for selective and sensitive detection of ions in complex matrices. In this technique, the electrical potential of an indicator electrode (ion-selective electrode, or "ISE") provides quantitative information on the activity of the analyte. This potential is measured with respect to a reference electrode that maintains a constant and sample-independent potential throughout the experiment. Most commercially available potentiometric ion-selective and reference electrodes are bulky, delicate, expensive, require large sample volumes, and should be maintained by skilled users; thus, they are not suitable for detection at the point of use, and for resource and cost limited applications.

SUMMARY

In certain embodiments, the present disclosure relates to an ion-sensing electrode comprising at least one thread, each thread comprising a plurality of fibers; a conductive coating covering at least a portion of the thread, wherein the conductive coating comprises a conducting polymer or a conducting material that includes a material that is similar to a target ion to be sensed in a test solution; and a barrier material covering at least a portion of the conductive coating, wherein said barrier material reduces passage of the test solution past the barrier material.

In certain embodiments, the ion-sensing electrode further comprises an ion selective membrane covering at least a portion of the conductive coating.

In certain embodiments, the ion selective membrane comprises a polymer, an ionophore that binds to the target ion to be sensed in the test solution, and a hydrophobic ion with charge opposite to the target ion.

In certain embodiments, the polymer is a plasticized polymer.

In certain embodiments, the thread comprises nylon, cotton, polyester, polypropylene, or combinations thereof.

In certain embodiments, the conductive coating comprises a conducting polymer and one or more conductive particles.

In certain embodiments, the barrier material comprises a hydrophobic polymer, an epoxy resin, a curable gel, nail polish, or combinations thereof.

In certain embodiments, the ion-sensing electrode further comprises an insulating sheath covering at least a portion of the thread.

In certain embodiments, the insulating sheath comprises a hydrophobic polymer or a heat curable tubing.

In certain embodiments, a bundle containing a plurality of ion-sensing electrodes is provided.

In certain embodiments, the present disclosure relates to a reference electrode comprising at least one thread, each thread comprising a plurality of fibers; a conductive coating covering at least a portion of the thread, wherein the conductive coating comprises a conducting polymer; a reference membrane covering at least a portion of the conductive coating, wherein the reference membrane comprises an ionic liquid or an electrolyte that leaches out to a test solution to create a sample-independent constant reference potential; and a barrier material covering at least a portion of the conductive coating and the reference membrane, wherein said barrier material reduces passage of the test solution past the barrier material.

In certain embodiments, the reference membrane further comprises a polymer.

In certain embodiments, the polymer is a plasticized polymer.

In certain embodiments, the thread comprises nylon, cotton, polyester, polypropylene, or combinations thereof.

In certain embodiments, the conductive coating comprises a conducting polymer and one or more conductive particles.

In certain embodiments, the barrier material comprises a hydrophobic polymer, an epoxy resin, a curable gel, nail polish, or combinations thereof.

In certain embodiments, the reference electrode further comprises an insulating sheath covering at least a portion of the thread.

In certain embodiments, the insulating sheath comprises a hydrophobic polymer or a heat curable tubing.

In certain embodiments, the ionic liquid comprises an electrolyte.

In certain embodiments, a bundle containing a plurality of ion-sensing electrodes and at least one reference electrode are provided.

In certain embodiments, a potentiometric cell comprising at least one ion-sensing electrode, a reference electrode, and a meter to detect the difference in voltage between the ion-sensing electrode and the reference electrode is provided.

In certain embodiments, the present disclosure relates to a method for making the ion-sensing electrode. The method comprises providing at least one thread, each thread comprising a plurality of fibers; applying a conductive coating to cover at least a portion of the thread, wherein the conductive coating comprises a conducting polymer or a conducting material that includes a material that is similar to a target ion to be sensed in a test solution; and applying a barrier material to cover at least a portion of the conductive coating, wherein said barrier material reduces passage of the test solution past the barrier material.

In certain embodiments, the method further comprises applying an ion selective membrane to cover at least a portion of the conductive coating.

In certain embodiments, the ion selective membrane comprises a polymer, an ionophore that binds to the target ion to be sensed in the test solution and a counterion.

In certain embodiments, the polymer is a plasticized polymer.

In certain embodiments, the thread comprises nylon, cotton, polyester, polypropylene, or combinations thereof.

In certain embodiments, the conductive coating comprises a conducting polymer and one or more conductive particles.

In certain embodiments, the barrier material comprises a hydrophobic polymer, an epoxy resin, a curable gel, nail polish, or combinations thereof.

In certain embodiments, the method further comprises applying an insulating sheath to cover at least a portion of the thread.

In certain embodiments, the insulating sheath comprises a hydrophobic polymer or a heat curable tubing.

In certain embodiments, the present disclosure relates to a method for making a reference electrode. The method comprises providing at least one thread, each thread comprising a plurality of fibers; applying a conductive coating to cover at least a portion of the thread, wherein the conductive coating comprises a conducting polymer; applying a reference membrane to cover at least a portion of the conductive coating, wherein the reference membrane comprises an ionic liquid that leaches out to a test solution to create a sample-independent constant reference potential; and applying a barrier material to cover at least a portion of the conductive coating and the reference membrane, wherein said barrier material reduces passage of the test solution past the barrier material.

In certain embodiments, the reference membrane further comprises a polymer.

In certain embodiments, the polymer is a plasticized polymer.

In certain embodiments, the thread comprises nylon, cotton, polyester, polypropylene, or combinations thereof.

In certain embodiments, the conductive coating comprises a conducting polymer and one or more conductive particles.

In certain embodiments, the barrier material comprises a hydrophobic polymer, an epoxy resin, a curable gel, nail polish, or combinations thereof.

In certain embodiments, the method further comprises providing an insulating sheath to cover at least a portion of the thread.

In certain embodiments, the insulating sheath comprises a hydrophobic polymer or a heat curable tubing.

In certain embodiments, the present disclosure relates to a method for making a potentiometric cell. The method comprises providing at least one ion-sensing electrode, providing a reference electrode, and electrically connecting the ion-sensing electrode and the reference electrode across a meter to detect the difference in voltage between the ion-sensing electrode and the reference electrode.

BRIEF DESCRIPTION OF THE DRAWINGS

FIGS. 5A and 5B show the design and working principle for thread-based multiplexed ion-sensor in accordance with certain embodiments.

FIGS. 10A and 10B show response of thread-based $K^+$ ion-sensing electrodes in accordance with certain embodiments. FIG. 10A shows the effect of ion-to-electron transducer material on response of nylon-based $K^+$ sensors and FIG. 10B shows the effect of thread-type on response of $K^+$ ISEs with carbon graphite as ion-to-electron transducer material.

DETAILED DESCRIPTION

Certain embodiments of the present disclosure is directed to a durable potentiometric solid-contact ion-sensing electrodes utilizing threads that are suitable for in-field and point-of-care analyses in resource and cost limited settings. In certain embodiments, application of thread-based potentiometric sensors to diagnostics and analytical tools for detection at the point of use is described herein.

Sensing Electrodes

Figure 1A:
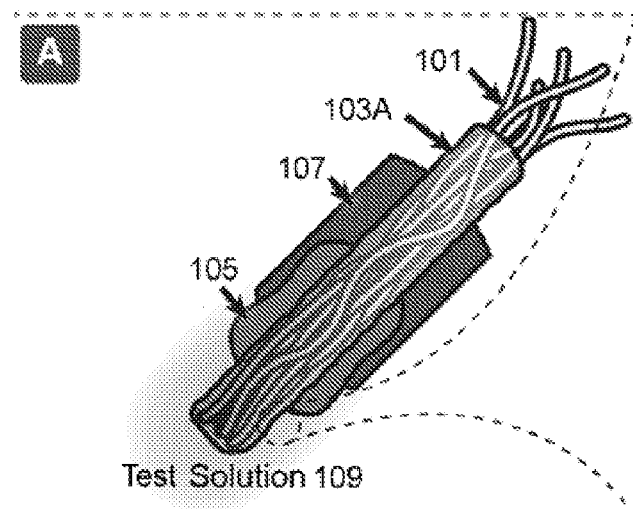
FIGS. 1A-1D show the design and working principle of thread-based ion-sensing electrodes in accordance with certain embodiments.
Figure 1B:
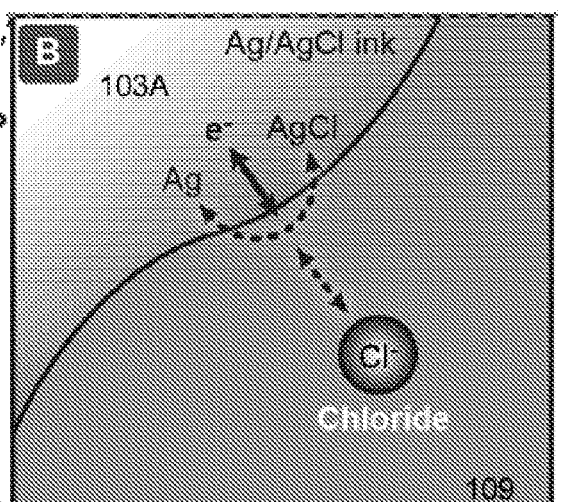
Figure 1C:
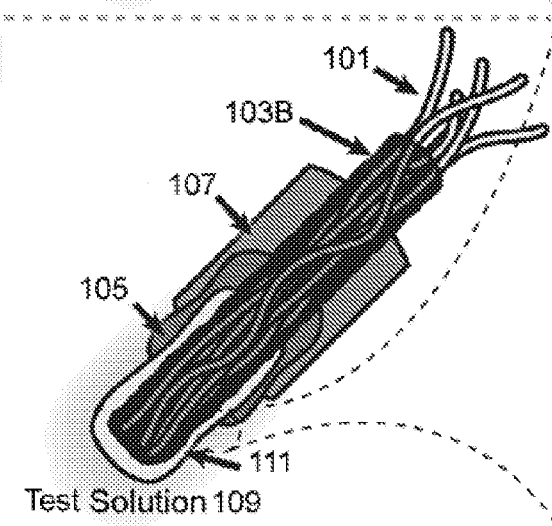

FIGS. 1A and 1C shows exemplary thread-based ion-sensing electrodes 100A and 100C in accordance with certain embodiments. In certain embodiments, the thread-based ion-sensing electrodes 100A and 100C are suitable for single-use. In other embodiments, the thread-based ion-sensing electrodes 100A and 100C are suitable for multiple uses.

Threads

As shown in FIGS. 1A and 1C, ion-sensing electrodes 100A and 100C can include a thread 101 containing a plurality of fibers. The plurality fibers can be woven together or non-woven. The thread 101 can be made of any suitable material, such as nylon, cotton, polyester, polypropylene, wool, metals spun into fiber, and the like.

Conductive Coating

The thread 101 can be coated with a suitable conductive coating 103. An exemplary conductive coating 103A made of Ag/AgCl is shown in FIG. 1B. Other suitable conductive coatings 103A include Ag/Ag₂S, LaF₃ (doped with europium fluoride EuF₂), and the like. The conductive coating 103A can be designed to include conductive materials that include ions, such as anions, that are desirably sensed in the test solution 109. For example, as exemplified in FIGS. 1A and 1B, if a chloride anion is desirably sensed in the test solution 109, the conductive coating 103A can include a conductive coating 103A that includes Ag/AgCl.

Without wishing to be bound by theory, as shown in FIG. 1B, utilizing a chloride ion as an exemplary ion to be sensed in the test solution, the chloride ion in solution can interact with the Ag/AgCl components in the conductive coating 103A using the redox system of $Ag_{(s)}/AgCl_{(s)}/Cl^-_{(aq)}$ where the potential of Ag/AgCl is determined by the activity of chloride ions in the sample. Other suitable ions in the test solution 109 can be sensed utilizing the respective redox systems that will be readily apparent to one skilled in the art.

In certain embodiments, as shown in FIG. 1C, other conductive coating 103B can be utilized. In certain embodiments, the conductive coating 103B can function as an ion-to-electron transducer and the electrical potential of this conductive coating 103B can be measured relative to a reference electrode (discussed more fully below). Some suitable conductive coating 103B that can function as an ion-to-electron transducer can include a conductive polymer, inks made of carbon materials (carbon graphite, carbon nanotubes, carbon black, and other forms of carbon), inks made of conducting polymers (example poly(3,4-ethylene-diox-ythiophene)-poly(styrenesulfonate, and other types of conducting polymers known to the state of the art), inks made of metal nanoparticles, and the like. Some exemplary conducting polymer includes poly(3,4-ethylenediox-ythiophene)-poly(styrenesulfonate) ("PEDOTPSS"), polythiophene, polypyrrole, and the like. In certain embodiments, the conductive coating 103B can further include conductive particles, such as nanomaterials, carbon nanotubes, carbon black, graphite particles, mesoporous carbon, and the like.

Ion-Selective Membrane

In the configuration shown in FIG. 1C, the tip of the thread-based ion-sensing electrode can be further provided with an ion-selective membrane ("ISM") 111. In certain embodiments, the ISM can include a hydrophobic membrane (e.g., a plasticized polymer) 111A, a receptor that selectively binds to the target ion (referred to as the ionophores) 111B, and a hydrophobic ion 111C used as counterion to the target ion. Here, as shown in the zoomed-in image of FIG. 1B, any desirable cation to be sensed in the test solution 109 can migrate into the ion-selective membrane 111 and be sensed by the ion-sensing electrode. Some suitable cations and anions that can be sensed include $K^+$, $Na^+$, $Ca^{2+}$, $Mg^{2+}$, $H^+$, $Li^+$, $Rb^+$, $Cs^+$, $NH_4^+$, $Be^{2+}$, $Sr^{2+}$, $Ba^{2+}$, $Cu^{2+}$, $Ag^+$, $Zn^{2+}$, $Cad^{2+}$, $Hg^{2+}$, $Tl^+$, $Bi^{3+}$, $Pb^2$, $CO_3^{2-}$, $HCO_3^-$, $SCN^-$, $NO_2^-$, $NO_3^-$, $OH^-$, $Cl^-$, $ClO_4^-$, $I^-$, and the like. The electrical potential at the interface of the ISM and the sample depends on the activity of target ion in the sample.

Without wishing to be bound by theory, the target cation is able to pass into the ISM 111, the ionophore 111B can then bind to the target cation, and the complex of the target cation with the ionophore 111B and the hydrophobic counterion IIC can traverse to the conductive coating 103B. Once the complex reaches the conductive coating 103B, the conductive coating 103B can function as an ion-to-electron transducer to generate an electrical charge, leading to the detection of the target cation in the test solution 109.

Barrier Material

Further, as shown in FIGS. 1A and 1C, at least a portion of the thread containing the conductive coating 103A or 103B can be provided with a barrier material 105. For example, if the conductive coating 103A or 103B allows the test solution 109 to pass through to the opposite end of the thread-based ion-sensing electrode (e.g., the conductive coating 103A or 103B is porous or semi-porous, or the conductive coating 103A or 103B coats the thread in an uneven manner, etc.), a faulty measurement can be obtained. Hence, in such situations, a portion of the conductive coating 103A or 103B can be provided with a barrier material 105 that is resistant to the test solution 109 passing through the fiber, such as through a wicking action. Some suitable barrier material 105 includes hydrophobic polymers, epoxy resins, curable gels, nail polish, and the like.

Insulating Sheath

Further, as shown in FIGS. 1A and 1C, at least a portion of the thread-based ion-sensing electrode can be provided with an insulating sheath 107. Any suitable material can be utilized as the insulating sheath, such as a hydrophobic polymer, and the like. In certain embodiments, the insulating sheath 107 can be a heat-shrinkable tubing.

Bundles

In certain embodiments, thread-based ion-sensing electrodes can be designed to be selective to different ions and bundled together to allow multiplexed ion-sensing in small volumes of sample. Particularly, in such bundles, the insulating sheath 107 can be provided in each thread-based ion-sensing electrode to provide an electrical insulation among each of the electrodes. In certain embodiments, multiplexed analysis of blood physiological electrolytes with thread-based ISE bundle in human urine and blood serum is provided.

Fabrication

Figure 2A:
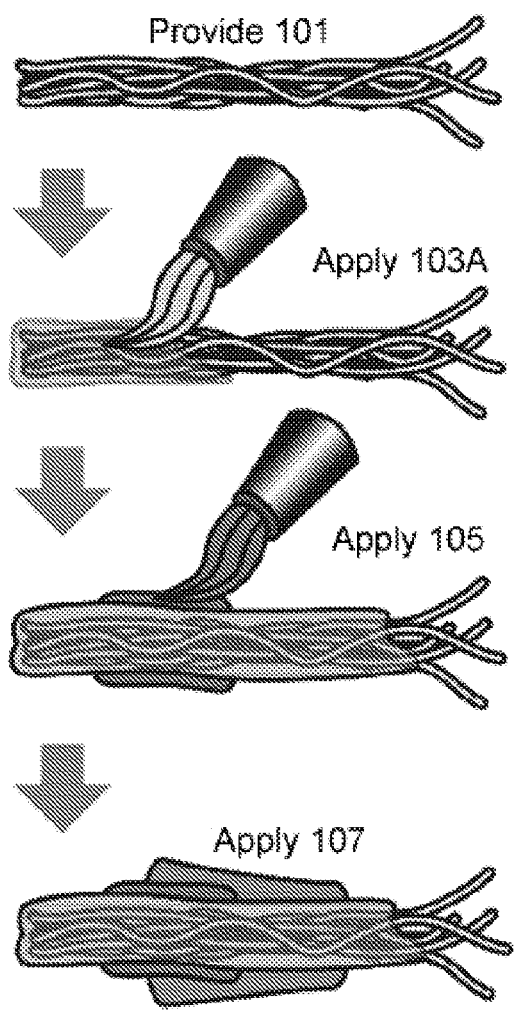
FIGS. 2A and 2B show the fabrication process for thread-based ion-sensing electrodes in accordance with certain embodiments.
Figure 3A:
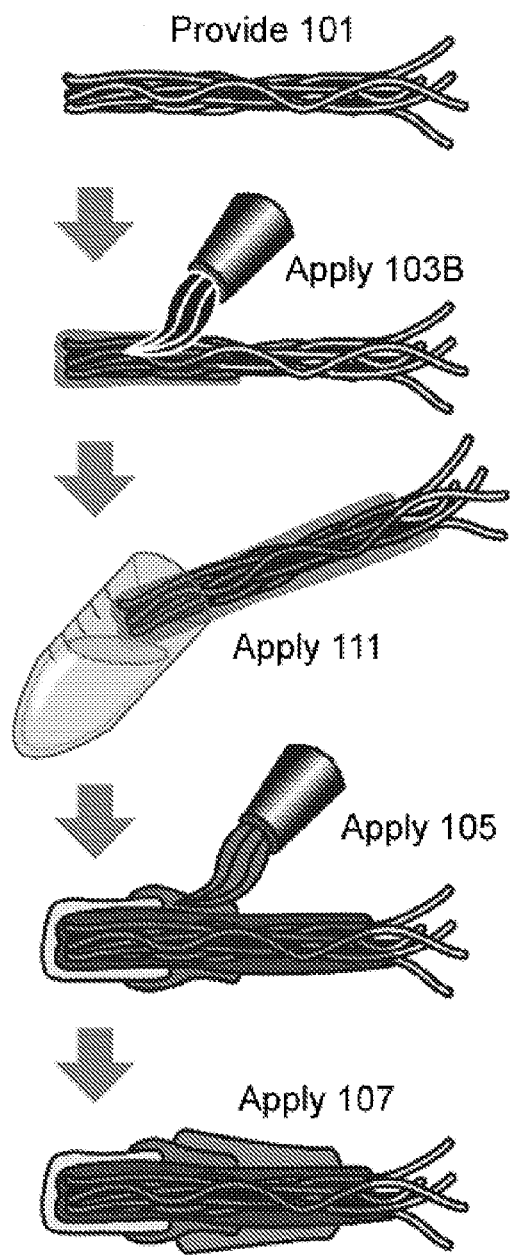
FIGS. 3A and 3B show the fabrication process for thread-based ion-sensing electrodes in accordance with certain other embodiments.

FIGS. 2A and 3A show exemplary methods for fabricating the thread-based ion-sensing electrodes described in FIGS. 1A and 1C, respectively.

As shown in FIG. 2A, in certain embodiments, thread 101 can be provided over which the conductive coating 103A can be applied to a portion thereof. Barrier material 105 can then be provided to a portion of the conductive coating 103A, which is then followed by application of the insulating sheath 107.

As shown in FIG. 3A, in certain embodiments, thread 101 can be provided over which the conductive coating 103B can be applied to a portion thereof. ISM 111 can be applied to a portion of the conductive coating 103B and a barrier material 105 can be provided to a portion of the conductive coating 103B and the ISM 111. Thereafter, the insulating sheath 107 can be applied.

Reference Electrodes

In many instances, accurate detection of the exact amount of a target ion test solution 109 is measured relative to a reference electrode. In certain embodiments, a solid-contact thread-based reference electrode to make a complete potentiometric cell with thread-based sensors is described.

In certain embodiments, commercially available reference electrodes can be utilized. For example, commercial reference electrodes that function based on the redox system of $Ag_{(s)}/AgCl_{(s)}/Cl^-_{(aq)}$ can be utilized. The Ag/AgCl electrode (typically as a silver wire coated with silver chloride) can be immersed in a reference solution with high concentration of $Cl^-$, and the reference and sample solutions can contact though a junction that maintains a small flow of the reference solution to the test solution 109. This design allows electrical contact between the two solutions but avoids significant mixing of the two solutions (porous glass frits and glass sleeve junctions are the two commonly adopted junction types).

Figures 4A, 4B:
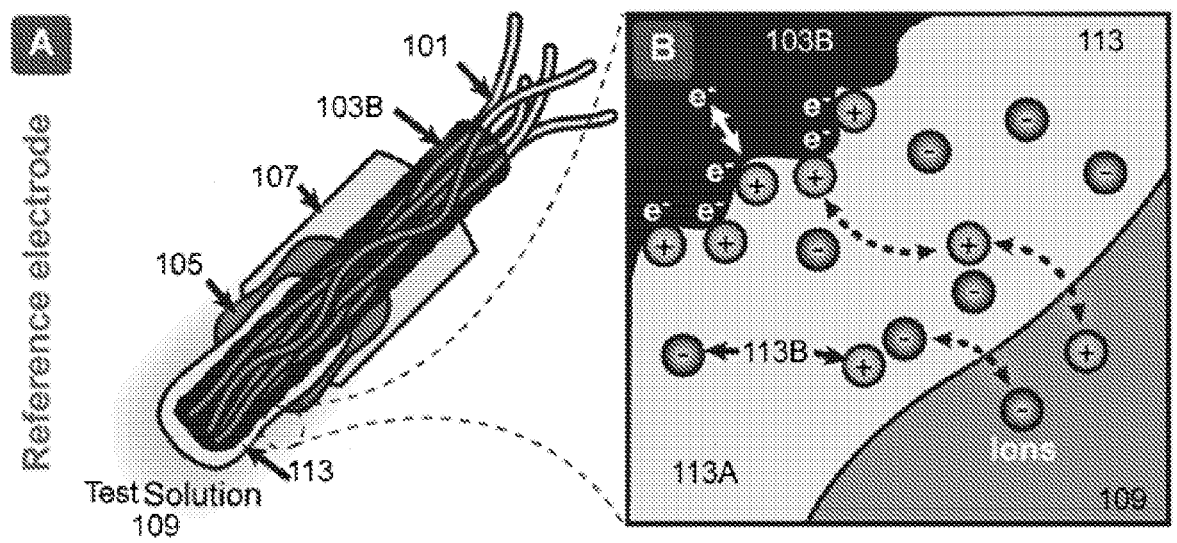
FIGS. 4A and 4B show the design and working principle for thread-based reference electrodes in accordance with certain embodiments.

In other embodiments, reference electrodes can be fabricated in a similar fashion to that of the thread-based ion-sensing electrodes. In certain embodiments, reference electrodes can be fabricated in much the similar fashion as that shown in FIG. 3A, except that a reference membrane 113 can be applied to the portion of the conductive coating 103B instead of the ISM 111. The reference membrane 113 can include a plasticized polymer 113A and an ionic liquid 113B (e.g., leachable electrolyte) that slowly and continuously leaches out to the test solution 109 and create a sample-independent constant potential. The exemplary reference electrode is shown in FIGS. 4A and 4B. This referencing electrode 400 does not need chloride-containing reference solutions or complicated junctions, and does not contaminate the sample due to diffusion and leakage of KCl from the reference solution, as in a commercially available reference electrode.

Potentiometric Cell

FIGS. 5A and 5B show an exemplary thread-based multiplexed ion sensor arranged into a potentiometric cell. As shown, one or more of the thread-based ion sensing electrodes 100 can be bundled together and provided with at least one reference electrode 400. The electrodes can be provided into a test solution 109 and the potential difference between any one of the thread-based ion-sensing electrodes 100 and the reference electrode 400 can be read out.

The relationship between the potential of the ion-sensing electrodes 100 (measured with relative to the reference electrode 400 and referred to as electromotive force or emf) and the activity of the analyte can be described by the Nernst equation $$\left(\text{emf} = E^\circ + \frac{RT}{zF} \ln a\right),$$

where $E^\circ$ represents the standard potential, R the universal gas constant, T the temperature, F the Faraday constant, and z and a the charge and the activity of the ion. An order of magnitude change in the activity of the ion with charge z, can result in 59.2 mV/z change in the potential of the ISE 100 (59.2 mV/z is referred to as Nernstian slope).

Advantages

Thread-based ion-sensing electrode is an attractive material for development of affordable potentiometric ion-sensing devices with multiplexing capabilities. The thread-based multiplexed ion-sensor bundle can be easily customized according to the type of analysis and can measure in sample volumes as low as 200 μL. The fabrication process is very simple and scalable, does not require use of stencils or complicated masks, screen printing or any other complicated equipment, which allows manufacturing of these sensors at low costs and specifically in resource limited settings. Moreover, a variety of thread types and ion-to-electron materials can be employed in the fabrication process. The characteristics of thread-based ISEs such as limit of detection, response range, potential stability, and $E^\circ$ reproducibility are similar to that of conventional ISEs. Advantages of the thread-based ion-sensor with-respect to its paper-based counter-parts are that it can be used for continuous measurements (e.g., real-time monitoring of electrolyte levels during invasive surgeries), can be used both as a re-usable or single-use device, has multiplexing capabilities, and has a simpler fabrication process. Disadvantages are the need for a container to hold the sample solution and sample volumes higher than paper-based potentiometric devices. Employing a hand-held electrical reader for the potential readout are necessary steps for the successful transition of this platform from laboratory to the field. This device can be employed in several areas including clinical diagnostics i,e, analysis of blood electrolytes, and in agriculture and soil analysis, i.e., measurement of fertilizers such as nitrate, ammonium, and calcium in soil to improve plant growth, and for wearable devices for analysis of physiological electrolytes in sweat.

Mechanical and Operational Durability

Figures 18A, 18B, 18C:
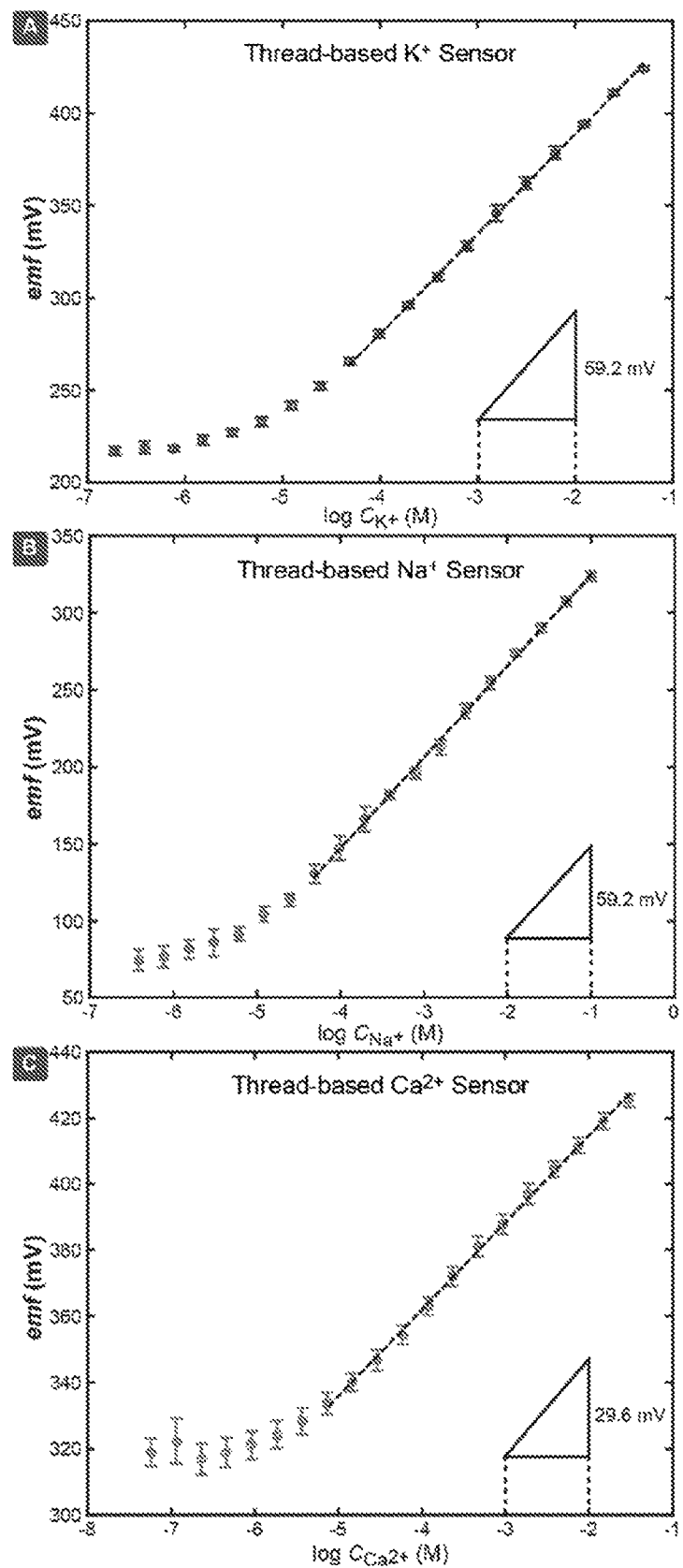
FIGS. 18A through 18C show response of thread-based $K^+$, $Na^+$, and $Ca^{2+}$ selective electrodes made with cotton and carbon black ink. The average and standard deviation of emf of five identically prepared electrodes are shown. The triangles represent the theoretically-expected Nernstian slope.
Figure 19:
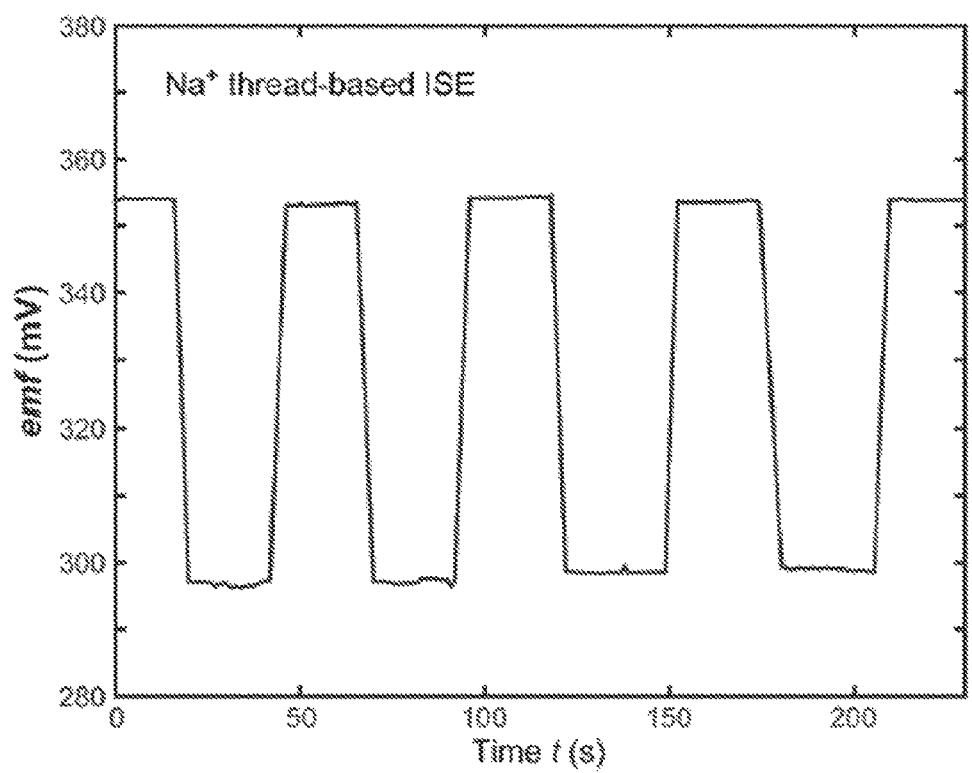
FIG. 19 demonstrates the reusability of the $Na^+$ thread-based ISE. A thread-based $Na^+$ selective ISE, successively immersed in 1 mM and 10 mM NaCl, is shown. For each solution change, the electrode was rinsed by deionized water and gently dried with tissue paper.

Because potentiometry is a non-destructive technique, the ISM and the reference membrane are not damaged during most measurements and ISEs are re-usable. Due to high mechanical strength of threads, thread-based ISEs can be re-used for many measurements. The reusability of thread-based ISEs are demonstrated by measuring the calibration curves (see FIGS. 18A-18C) with one set of electrodes and changing the concentration of $Na^+$, $K^+$, and $Ca^{2+}$ in the test solution. The ISM is hydrophobic and fills in the spaces between the fibers of thread, and also covers the length of the thread that is exposed to the sample, so aqueous solutions are not trapped in the fibers of the thread. There might be some residual sample left on the surface of the ISM which can be washed away simply by rinsing the area that was exposed to sample, and the sensor can be reused immediately and placed in a different test solution. To further demonstrate the reusability of the thread-based sensors, a Na$^+$ sensor was placed successively in different solutions (1 and 10 mM Na$^+$) and showed that the sensor responds correctly and reversibly (see FIG. 19).

Currently, conventional portable ion-sensing electrodes are based on paper substrates. The instant thread-based ion-sensing electrodes offer significant advantages. Both paper and thread are useful substrates for development of ISEs suitable for in-field or point-of-care applications. The differences between the two can be summarized as follows: i) Fabrication of thread-based ISEs is simpler than that of paper-based ISEs, ii) The mechanical strength of thread is higher than paper, therefore, thread-based ISEs are more resistive towards wear and tear and are more suit-able for fabrication of reusable potentiometric sensors than paper-based ISEs, iii) Paper-based ISEs are suitable for a planar design (add a drop of sample on a flat device). Thread-based ISEs can be used similar to conventional ISEs where electrodes are dipped in the sample solution. This mode of utility makes thread-based ISEs more suitable for continuous monitoring of samples with changing compositions, iv) Multiplexed ion-sensing with thread-based ISEs is customizable; ISEs selective for different ions can be bundled with the reference electrode to allow multiplexed ion-sensing in small volumes of sample. The ISE bundle can easily be disassembled, and the individual ISEs and reference electrode can be used again to fabricate a different ISE bundle (for sensing of a different set of ions). To accomplish multiplexed ion-sensing on paper, paper should be patterned with a conductive ink, ISMs (for detection of differentions) should be drop-casted on paper, and sealed with a mask. Changing the list of ions that the paper-based ISE detects is not as easy as it is for the thread-based ISE bundle, and a new device must be fabricated to accommodate any changes in the ions that the device senses.

Multiplexed Ion-Sensing with ISEs

Potentiometric measurements are performed under zero-current conditions, therefore, electrical potential of multiple ISEs can be simultaneously measured relative to one reference electrode in the solution, without the need for complicated electronic circuits for control of voltage and current in all the channels of the potentiometer. In fact, all the measurements shown in this work were carried out by monitoring potential of seven electrodes relative to one reference electrode using a relatively low-cost potentiometer ($\approx$$1500, potentiometer capable of simultaneous measurement of voltage of 16 channels). Multiplexed ion-sensing with thread-based ISEs can simply be accomplished by creating a bundle of individual thread-based ISEs with one thread-based reference electrode, and measuring the potential of the ISEs relative to the reference electrode, see FIGS. 5A and 5B. Due to compact design of the thread-based electrodes, a bundle of three ISEs and one reference electrode can be immersed in sample volumes as low as 200 µL. The required sample volume can be pushed to values lower than 200 µL by further optimization of the thickness of the thread used for fabrication of the ISEs. Selectivity of the sensor for the analyte is an important consideration for multiplexed sensing. Selectivity of the ISEs for the target ion is strongly dependent on the ionophores that is employed in the ISM. Ionophore-based ISEs usually respond very selectively to the target ion which enables detection of the target ion in complex matrices in presence of other ions. To provide quantitative values for selectivity of the electrodes developed in this work, the Na$^+$ ISE developed in this work (sodium ionophore X) responds at least 100 times stronger to Na$^+$ than K$^+$ and Ca$^{2+}$, and the K$^+$ ISE (ionophores: valinomycin) responds at least 10,000 times stronger to K$^+$ than Na$^+$ and Ca$^{2+}$. Due to high selectivity of potentiometric sensors for the target ion, and the compact design of the thread-based ISE bundle, multiplexed ion-sensing at the point of use in small volumes of sample can be accomplished with thread-based ISEs.

Electrode-to-Electrode Reproducibility of the Sensors

Assuming identically-prepared ISEs exhibit the same potentials in a solution containing a known amount of the target ion, calibration of one device from a batch of sensors can be carried out, and a calibration equation for determining the activity of the analyte from an emf value obtained by another sensor from this batch can be utilized. In this case, application of the sensors in the field becomes very simple, and calibration of individual electrodes is not necessary.

Identically prepared solid-contact ISEs are all functional and respond to the target ion. However, they exhibit slightly different potential values in a solution of target ion, resulting in different values of E° (10 s of mVs). Bundling multiple sensors together and simultaneous calibration of all electrodes in one series of standard solutions makes application of the sensor more practical.

To put this reproducibility in the E° into perspective, two ISEs (for detection of a monovalent ion) with identical slopes and only 1 mV difference in their E° values can be taken as an example. If one electrode is calibrated and this calibration equation is used for analysis with the other electrode, a 4% error can be introduced in the determined activity of the analyte. Due to the relationship of potential of the ISE and the activity of target ion $$\left(E = E° + \frac{RT}{zF}\ln a\right),$$

any errors in the potential (either from the electrical measurement or estimation of the E°) can be exponentially reflected as error in the activity of the target ion.

Generally, electrode-to-electrode reproducibility in the E° values of thread-based ISEs ranging from 2.9 to 30.4 mV (the range being similarly observed in other conventional ISEs), and each sensor may be calibrated before use. Different approaches can be adopted for improving E° reproductivity of thread-based ISEs to perhaps decrease or eliminate the need for calibration of individual electrodes, such as application of a potential or current pulse to ISEs after their fabrication, short-circuiting the ISE with a reference electrode immersed into the same solution for several hours, and doping the ISM with the lipophilic Co(II)/Co(III) redox buffer.

The required value for the electrode-to-electrode E° reproducibility of the ISEs is dictated by the tolerable error in each particular analysis; if the desired reproducibility cannot be accomplished, each individual electrode can be calibrated prior to the measurement. Bundling multiple sensors together and simultaneous calibration of all electrodes in one series of standard solutions makes application of the sensor more practical.

Example 1

Materials:

Potassium ionophore I, sodium ionophores X, calcium ionophore II, potassium tetrakis(4-chlorophenyl)borate (KTPCIB, Selectophore grade), Sodium tetrakis[3,5-bis(trifluoromethyl)phenyl]borate (NaTFPB, Selectophore grade), 2-nitrophenyl octyl ether (o-NPOE), high molecular weight poly(vinyl chloride) (PVC), tetrahydrofuran (THF, inhibitor-free, for HPLC, purity ≥99.9%), and poly(3,4-ethylenedi-oxythiophene)-poly(styrenesulfonate) (PEDOT:PSS, 5 wt %, screen-printable ink) were purchased from Sigma-Aldrich.

Carbon graphite and Ag/AgCl inks was purchased from Ercon (Wareham, MA).

Carbon black (BP 2000, LOT-3917778) was provided by CABOT (Alpharetta, GA).

1-Methyl-3-n-octylimidazolium bis(trifluoromethyl-sulfonyl)imide, 99%, was purchased from Alfa Aesar.

Polyolefin heat shrinkable tubing (product of Uxcel) was purchased from Amazon.

Cotton threads (100% mercerized crochet threads, Classic 10, product of Aunt Lydias), 3-ply Nylon (Nylon Twine, product of Katzco), polypropylene (Twisted Mason Line, product of Home Depot), and polyester (Twisted Mason Line, product of Rope King) threads were purchased from Amazon.

Polystyrene tipped swabs for applying inks to thread were purchased from Puritan Medical Products.

Fabrication

The solutions to apply ion-selective membranes and reference membranes were prepared by dissolving total of 1.0 g of membrane components in 2.5 mL of THF. Other organic solvents that dissolve the ISM can be substituted.

Cation sensing membranes contained PVC and o-NPOE with 1:2 weight ratio, 1 wt % of the corresponding ionophore and the adjusted amount of ionic site (KTPCIB for $K^+$ and $Ca^{2+}$, and NaTFPB for $Na^+$) to achieve an ionophores to ionic site molar ratio of 2:1 for $K^+$ and $Na^+$, and 3:1 for $Ca^{2+}$. Other compositions of polymers, plasticizers, ionophores, and ionic sites can be used alternatively.

The K+ sensing membrane contained o-NPOE (65.85 wt. %), PVC (32.95 wt. %), valinomycin (1.00%), and KTPCIB (0.20 wt. %) with a 2:1 molar ratio of ionophore to KTPCIB. Other compositions of polymers, plasticizers, ionophores, and ionic sites can be used alternatively.

The sodium sensing membrane contained o-NPOE (65.71 wt. %), PVC (32.85 wt. %), sodium ionophores III (1.00 wt. %), and NaTFPB (0.44 wt. %) with a 2:1 molar ratio of ionophore to NaTFPB. Other compositions of polymers, plasticizers, ionophores, and ionic sites can be used alternatively.

The calcium sensing membrane contained -NPOE (65.76 wt. %), PVC (32.88 wt. %), calcium ionophores III (1.00 wt. %), and KTPCIB (0.36 wt. %) with a 2:1 molar ratio of ionophore to KTPCIB. Other compositions of polymers, plasticizers, ionophores, and ionic sites can be used alternatively.

Reference membrane contained 30 wt % PVC, 60 wt % o-NPOE, and 10 wt % 1-Methyl-3-n-octylimidazolium bis (trifluoromethyl-sulfonyl)imide. Other compositions of polymers, plasticizers, and ionic liquids and electrolytes for fabrication of reference membranes can be used alternatively.

Carbon black ink was prepared by grinding (with a pestle) 0.3 g of carbon black powder, 0.46 g o-NPOE, 0.23 g PVC, 3 mL of THF, and 5 mL of cyclohexanone in a mortar. Other ratios of carbon black (or other types of carbon such as carbon nanotubes), o-NPOE (or other plasticizers), and PVC can be used.

The 3-ply Nylon, polypropylene, and polyester threads were unwound into three thinner threads (fiber bundles) and these fiber bundles were cut into 8-cm pieces. The length of the thread can be varied to fabricate an electrode with the desired size.

Cotton threads were used without alteration, and simply cut into 8-cm pieces. The length of the thread can be varied to fabricate an electrode with the desired size.

A polystyrene tipped swab was used to apply the conductive inks to thread and allowed the ink to dry overnight at ambient temperature.

Then one end of ink-coated thread was attached to a paper clip, 3 cm of the other end of thread was dipped in the ion-selective or reference solution, and the thread was hung vertically to allow the membrane to set overnight at room temperature. The length of the thread dipped in the ion-selective or reference solution can be varied to fabricate an electrode with the desired size.

The thread was then painted with solution of nail polish (using the brush provided with the nail polish), covering 1 cm of the ISM and 2 cm of bare conductive ink on thread, and allowed the nail polish to dry at ambient temperature for two hours.

Then, the Ag/AgCl-coated or ink-ISM-coated thread was enclosed in a polyolefin heat shrinkable tubing only exposing about 5 mm of thread at each end. A heat gun was used to heat the tubes for 5 to 10 s to allow the tube to shrink and form a tight fit around the thread. The length of the thread coated with Ag/AgCl or ink-ISM can be varied to fabricate an electrode with the desired size.

Measurements

Unless noted otherwise, the response of the sensors (7 replicates) was measured at room temperature with respect to a free-flow double-junction AgCl/Ag reference electrode (with a movable ground glass sleeve junction, 1.0 M lithium acetate bridge electrolyte) purchased from Mettler Toledo.

For potential measurements, an EMF 16 channel potentiometer (Lawson Labs, Malvern, PA) controlled with EMF Suite 1.02 software (Lawson Labs) was used. The measurements were performed at room temperature ($\approx 25°$ C.) using a free-flow double-junction AgCl/Ag reference electrode (with a movable ground glass sleeve junction, 1.0 M lithium acetate bridge electrolyte) purchased from Mettler Toledo.

Resistivity of ink coated threads (Ag/AgCl, carbon graphite, carbon black, and PEDOT:PSS) were measured over 1.0 cm length of thread using a digital multimeter (Fluke Inc. 77IV, Everett, WA, USA). The resistance of the ion-selective membrane (ISM) were measured using a shunt method. In brief, the potential of ISE was measured in 100 mM KCl for 20 s (V1), connected the resistor Rtest (75 kΩ) test between the ISE and reference electrode, and the potential was measured again (Vtest). The resistance of ISE was calculated from the following equation:

$$R_{ISE} = R_{test}\left(\frac{V_1 - V_{test}}{V_{test}}\right)$$

Since the resistance of ISM is significantly higher than the conductive inks, the resistance of ISE can be approximated to be that of the ISM.

$$R_{ISE} \approx R_{ISM}$$

All the solutions were prepared with deionized purified water (18.2 MΩ·cm specific resistance, EMD Millipore, Philadelphia, PA). The calibrations were obtained by immersing the sensors (7 replicates) in different standard solutions, and measuring the emf. For Cl– calibrations (FIGS. 8 and 9), a new set of sensors were used for each data point.

Scanning electron microscope (SEM) measurements were conducted with field emission SEM (Zeiss Ultra 55) at Center for Nanoscale Systems (CNS) of Harvard University. The base pressure was $1.0 \times 10^{-4}$ mbar and the electron beam energy was at 5.0 keV.

Results and Discussion

Chloride Sensing

Figure 2B:
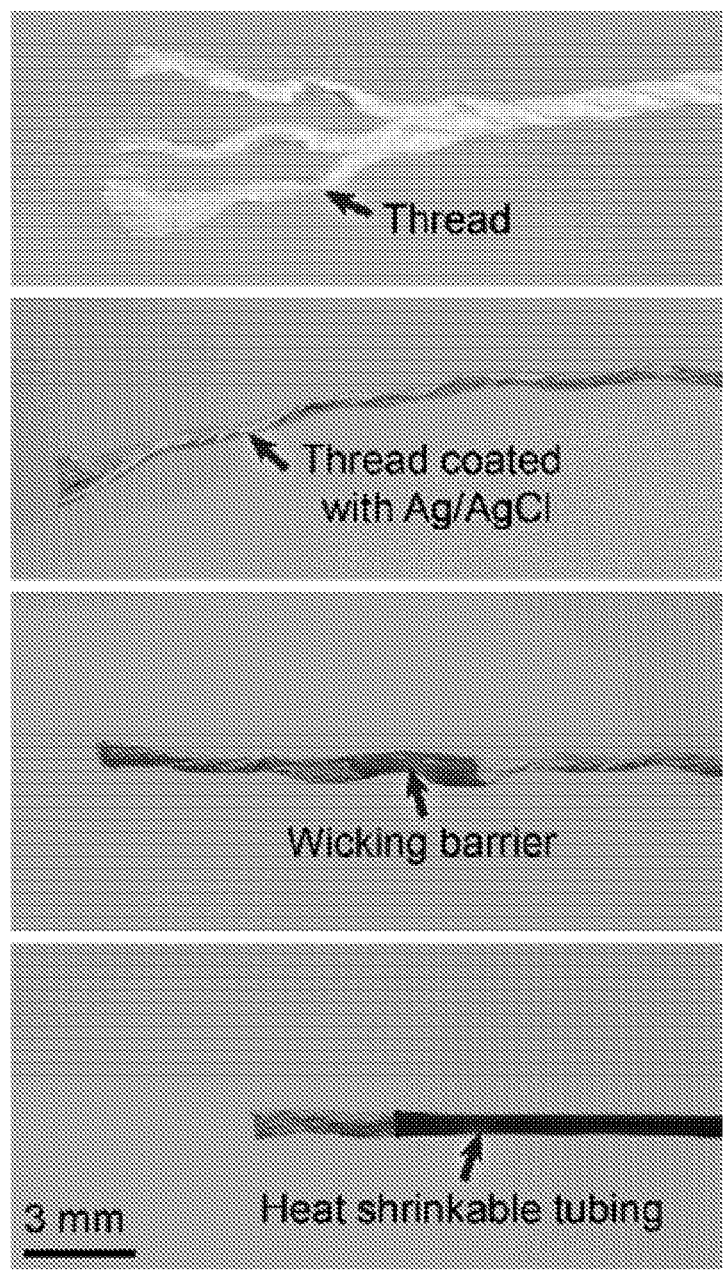

The sensing components and design of the thread-based chloride anion ISE are shown in FIGS. 1A and 1B. As shown, Ag/AgCl ink and different commonly used types of thread (cotton, Nylon, polyester, and polypropylene) were used to develop thread-based sensors for Cl–. The thread-based ion-sensing electrodes to detect chloride anions were fabricated as shown in FIG. 2B. The resistance of the threads saturated with Ag/AgCl were measured to ensure conductivity over the length of thread and resistances of less than 50 Ω/cm for all types of threads were obtained as shown in Table S1 below.

TABLE S1

Resistance of thread coated with conductive inks.

| Type of conductive coating | Thread Type | | | |
|---|---|---|---|---|
| | Nylon | Cotton | Polyester | Polypropylene |
| Ag/AgCl ($\Omega \cdot cm^{-1}$) | 2.5 ± 0.6 | 0.3 ± 0.1 | 33.3 ± 7.5 | 2.32 ± 1.4 |
| Carbon graphite ($\Omega \cdot cm^{-1}$) | 95.4 ± 22.4 | 169.5 ± 64.8 | 187.6 ± 57.4 | 114.1 ± 22.8 |
| Carbon black ($k\Omega \cdot cm^{-1}$) | 1.1 ± 0.2 | — | — | — |
| PEDOT:PSS ($\Omega \cdot cm^{-1}$) | 209.0 ± 15.2 | — | — | — |

Figure 6:
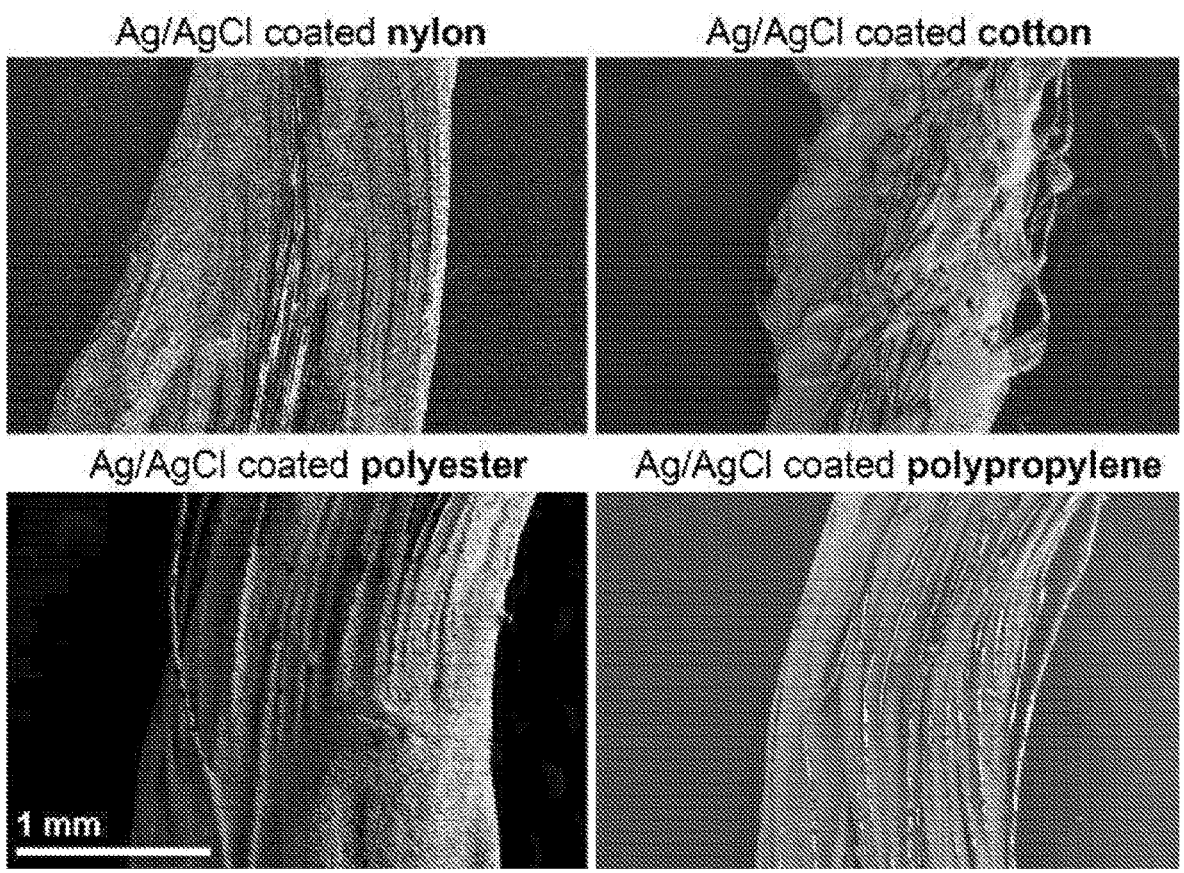
FIG. 6 shows SEM images of different threads coated with a conductive coating in accordance with certain embodiments.
Figure 7:
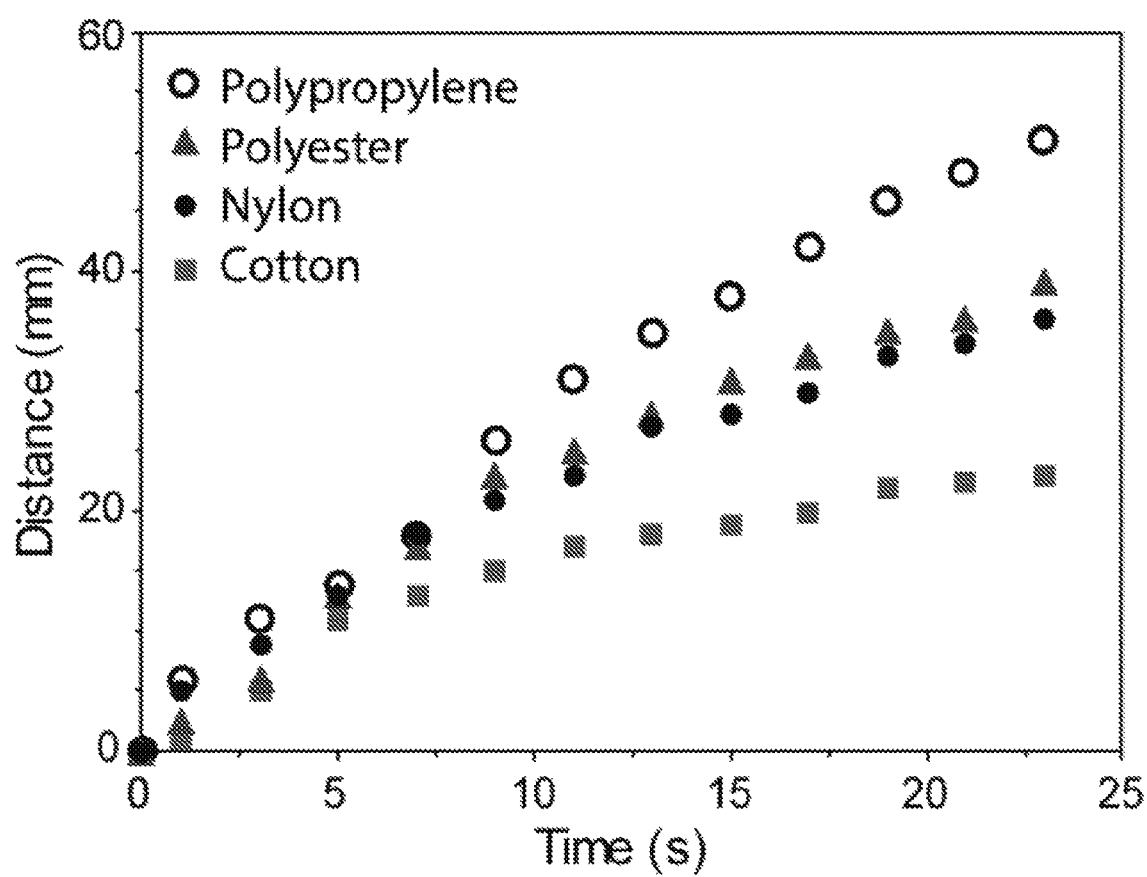
FIG. 7 shows the wicking of an aqueous solution of methylene blue (2.4 mg/ml) in individual cotton, nylon, polypropylene, and polyester threads. The data represents the distance traveled by the fluid front at different time points.

FIG. 6 shows the SEM images of Ag/AgCl coated threads, confirming that thread can be used as a matrix to contain the Ag/AgCl ink. The thread coated with Ag/AgCl functions as a potentiometric chloride sensor, where one end of the thread can be immersed in the sample solution and the other end can be used for electrical connection. Because the Ag/AgCl ink is hydrophobic, wicking of aqueous solution along the thread coated with Ag/AgCl was significantly slower than on bare thread. Wicking along 1 cm of cotton coated with Ag/AgCl occurred only after five hours (wicking was not observed over the course of five hours for Nylon, polyester, and polypropylene). As shown in FIG. 7, wicking along 1 cm of bare thread occurs in less than 10 s.

To ensure that thread-based chloride sensors can be used for long term measurements (several hours), and wicking along the thread coated with Ag/AgCl does not affect the electrical measurement, nail polish solution was applied to thread, as shown in FIG. 2B. Nail polish as a wicking barrier material 105, because it is hydrophobic, widely accessible, dries rapidly, and has good adhesion properties. Nail polish can be replaced by solutions of other hydrophobic polymers. As an additional step, the Cl⁻ sensor was enclosed in heat shrinkable tubing leaving approximately 5 mm of Ag/AgCl coated thread exposed at both ends (to contact the sample and for electrical connection). Heat shrinkable tubing as an insulating sheath 107 and a physical barrier (to avoid short-circuits) when multiple thread-based sensors are bundled together for multiplexing. The surface area of the thread coated with Ag/AgCl that is exposed to sample does not affect the potentiometric measurement (electrical potential does not depend on the sur-face area of the indicator electrode) and contact area of 5 mm was chosen simply due to convenience in the fabrication process.

Figure 8:
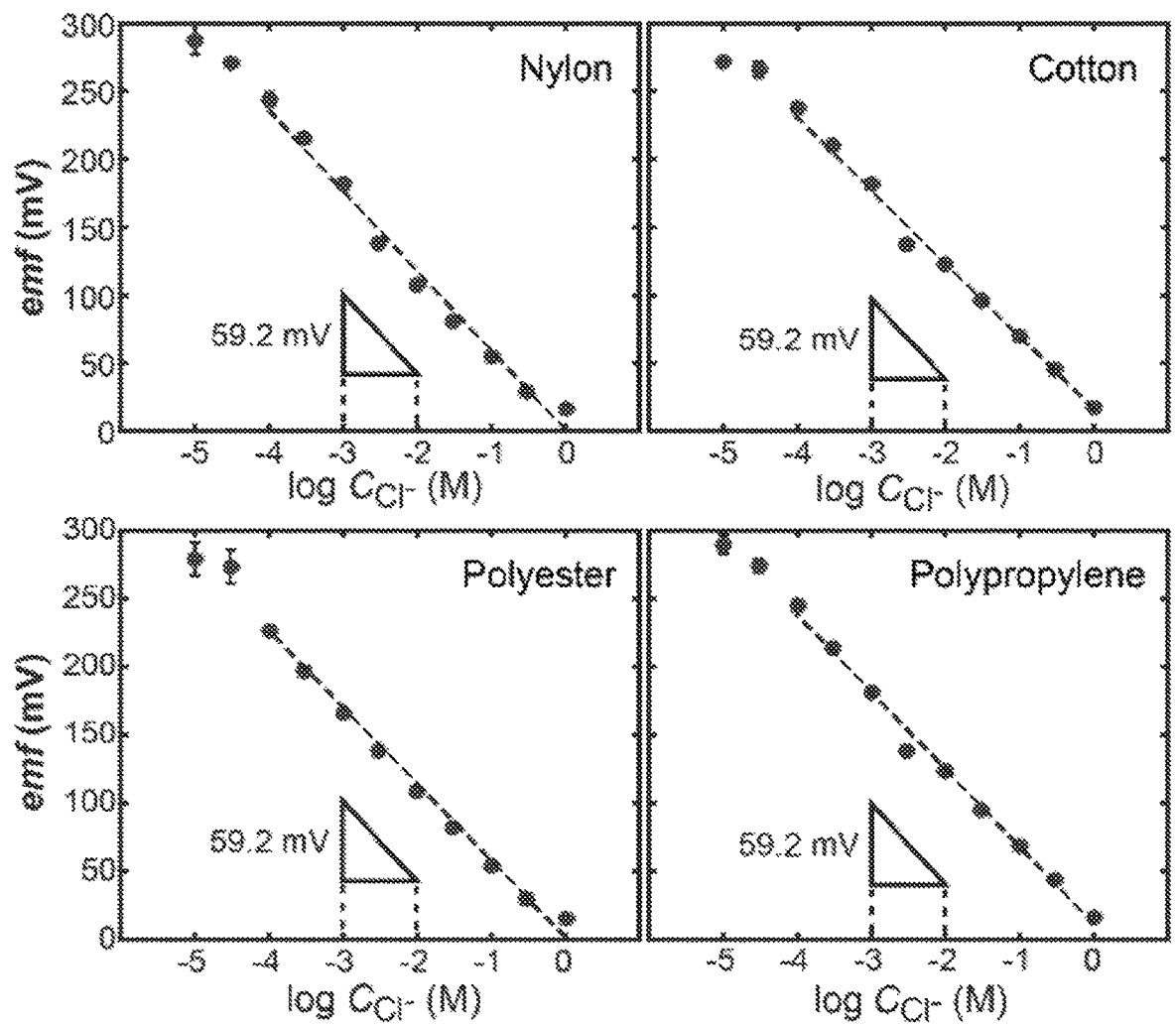
FIG. 8 shows the response of thread-based ion sensors in accordance with certain embodiments. Error bars are shown, but are mostly concealed by data symbols. Dashed lines show linear fits to the response.
Figure 9:
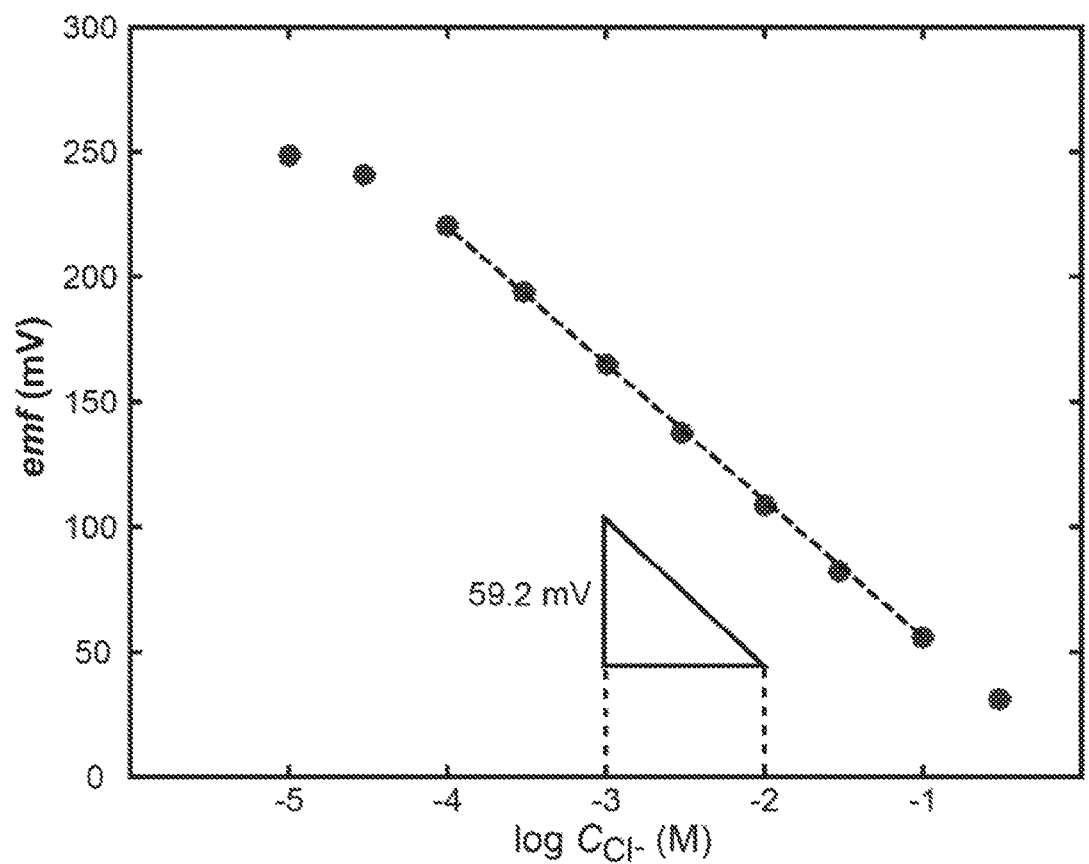
FIG. 9 shows the response of AgCl-coated Ag wire. Error bars are shown, but are concealed by data symbols. Dashed lines show linear fits to the response.

The response of thread-based Cl– ISEs were measured relative to a commercial reference electrode; a stable potential (less than 0.1 mV/min drift) was obtained approximately after 100 s of exposing the sensor to Cl– containing solutions. As shown in FIG. 8, thread-based Cl– ISEs functioned similar to an AgC-coated Ag wire and exhibited Nernstian slope in a range of 1.0 M to 0.1 mM Cl–. FIG. 9 shows the chloride response of the AgCl-coated Ag wire. 0.5 mV or better electrode-to-electrode reproducibility was obtained in the potential of the thread-based Cl– ISEs. No significant differences between the performance of cotton, Nylon, polyester, and polypropylene threads were observed: the response to Cl– was determined more by the properties the Ag/AgCl ink than of the material comprising the thread.

The thread-based Cl– sensors can be used both for single-use or multiple uses. Due to the hydrophobic surface of thread coated with Ag/AgCl, aqueous solutions are not trapped in the fibers of thread, and the sensor immediately responds to a change in concentration of Cl– in solution. The sensor can be reused simply by rinsing the area that was exposed to the sample, drying the electrode (with tissue wiper), and immersing it in a different test solution. To confirm re-usability of the Cl– thread-based sensor, response of the Cl– sensor in solutions containing different Cl– concentrations (sensor was rinsed, dried, and immersed in the next solution) was measured and a Nernstian slope was obtained. The thread-based Cl– sensors can also be used as a low-cost and disposable reference electrode where in contact with a solution that contains a constant concentration of Cl–.

Figure 1D:
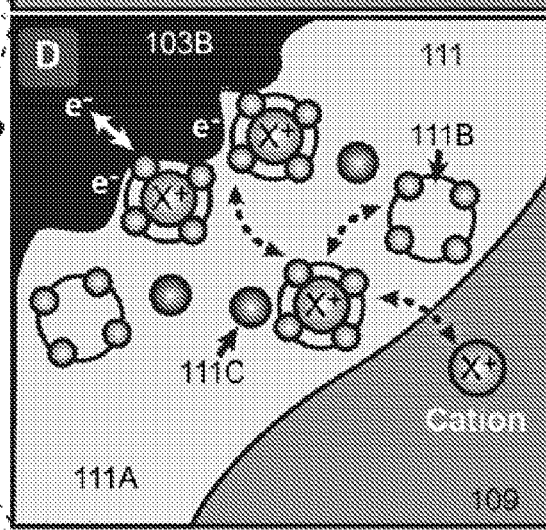
Figure 3B:
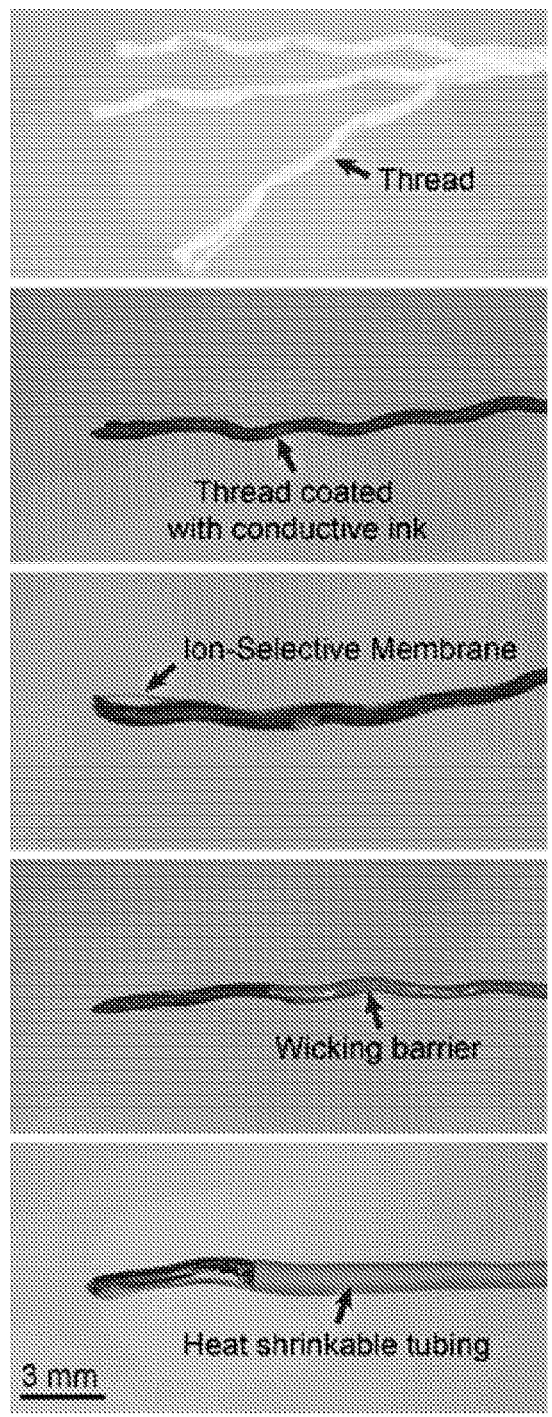

Cation Sensing:

The sensing components and design of thread-based $K^+$, $Na^+$, and $Ca^{2+}$ ISEs are shown in FIGS. 1C and 1D. The thread-based ion-sensing electrodes to detect cations were fabricated as shown in FIG. 3B. To demonstrate the versatility of threads as a substrate for fabrication of solid-contact ISEs, different thread-based electrodes were developed using poly(3,4-ethylenediox-ythiophene)-poly(styrene-sulfonate), PEDOT:PSS, and two carbon types of graphite and carbon black as ion-to-electron transducer materials. Two commercially available inks of carbon graphite (hydrophobic ink with an organic solvent) and PEDOT:PSS (hydrophilic aqueous ink) and one in-house-prepared hydrophobic ink (carbon black, PVC, and o-NPOE composite) were utilized to develop ISEs using Nylon, polyester, polypropylene, and cotton threads as substrate for containing the inks. This selection confirmed that both non-aqueous and aqueous inks (with compositions ranging from pasty to very thin) and types of thread other than cotton can be used for successful fabrication of thread-based ISEs. The inks were applied to thread using a swab, the ink was allowed to dry at room temperature over-night, and conductivity along the thread coated with all the ink was confirmed. Table 1 bellow lists resistance of thread coated with the inks.

TABLE 1

Electrolyte levels in human blood serum, measured by thread-based ISEs.

|  | $K^+$ | $Na^+$ | $Cl^-$ |
|---|---|---|---|
| Standard ISEs | 4.54 ± 0.04 mM | 140.42 ± 3.77 mM | 138.55 ± 3.06 mM |
| Thread-based Electrode bundle (Ref 1)[a] | 4.04 ± 0.08 mM | 108.17 ± 48.20 mM | 111.15 ± 5.54 mM |
| Thread-based Electrode bundle (Ref 2)[b] | 5.29 ± 0.56 mM | 149.22 ± 6.07 mM | 122.50 ± 9.80 mM |
| Thread-based Electrode bundle (Ref 2)[c] | 6.91 ± 1.28 mM | 159.74 ± 64.68 mM | 129.40 ± 67.72 mM |

[a]Commercial reference electrode
[b]Thread-based reference electrode with ionic liquid doped membrane
[c]Thread-based reference electrode with tetrabutylammonium tetrabutylborate doped membrane FIG. 3B shows the fabrication of thread-based cation-selective ISEs. 3 cm of one end of the conductive thread was dipped in the ion-selective solution (ISM dissolved in THF) and the membrane was allowed to set overnight at room-temperature. The other end of thread can be used to make electrical connection to the potentiometer. The sensor at this stage can be successfully used for cation sensing if the ISM-containing part of the thread is dipped in the test solution; dipping the thread further may expose the ion-to-electron transducer material directly to the sample; this contact may result in bypassing the ISM in the electrical measurement (resistance of ion-to-electron transducer is much lower than that of the ISM) and loss of the function of the ISE. To avoid this difficulty, heat shrinkable tubing was in conjunction with a nail polish were utilized to seal the ISM. The resistance of the ISEs prepared according to this procedure was close to the expected value for the ISM (100-300 KΩ), as shown below in Table S2. This agreement con-firmed that the sample solution did not contact the ion-to-electron transducer directly.

Effect of Conductive Ink and Type of the Thread on the Properties of the Electrode $K^+$ ISEs using Nylon was fabricated as a representative thread type, and different conductive inks of graphite carbon, carbon black, and PEDOT:PSS were utilized. The response of these sensor were measured relative to a commercial reference electrode. As shown in FIG. 10A, Nernstian slopes of 60.4±3.9, 51.1±2.2, and 50.0±3.0 mV/decade were obtained for ISEs with graphite, carbon black, and PEDOT:PSS inks, respectively. FIGS. 12A-12F shows the SEM images of Nylon coated with the ion-to-electron transducer inks, and the cross section of thread coated with the ISM and conductive inks. Carbon-black ink resulted in better stability in the response of the ISE to $K^+$ (0.07 mV/min drift in potential) than carbon graphite ink (0.55 mV/min drift in potential) and PEDOT:PSS ink (0.52 mV/min drift in potential). Drift in the potential of the ISE was measured over the first three minutes of the sensor's first exposure to an aqueous solution (100 mM KCl). Higher potential stability of ISEs with carbon black is not surprising since carbon black is porous and has a large surface area and specific capacitance; this high specific capacitance minimizes drift in the potential of ISEs with carbon-based ion-to-electron transducer materials. Moreover, the carbon black ink was prepared in-house and unlike the commercial carbon graphite and PEDOT:PSS inks did not contain surfactants that can interfere with the response of ISEs to ions. The electrode-to-electrode reproducibility in the standard

TABLE S2

Resistance of thread coated with conductive inks and ISM.

| | Thread Type | | | |
|---|---|---|---|---|
| Ion-to-electron transducer material and ISM | Nylon | Cotton | Polyester | Polypropylene |
| Carbon graphite, $K^+$ ISM (kΩ) | 185.1 ± 28.1 | 286.9 ± 65.1 | 174.4 ± 30.0 | 275.9 ± 90.7 |
| Carbon black, $K^+$ ISM (kΩ) | 143.1 ± 43.1 | — | — | — |
| PEDOT.PSS, $K^+$ ISM (kΩ) | 145.2 ± 60.3 | — | — | — |
| Carbon graphite, $Na^-$ ISM (kΩ) | 168.0 ± 15.3 | — | — | — |
| Carbon graphite, $Ca^{2+}$ ISM (kΩ) | 152.9 ± 18.7 | — | — | — |
| Carbon graphite. Ref Mem (kΩ) | 87.9 ± 13.0 | — | — | — |

Figures 11A, 11B, 11C, 11D, 11E, 11F, 11G, 11H, 11I:
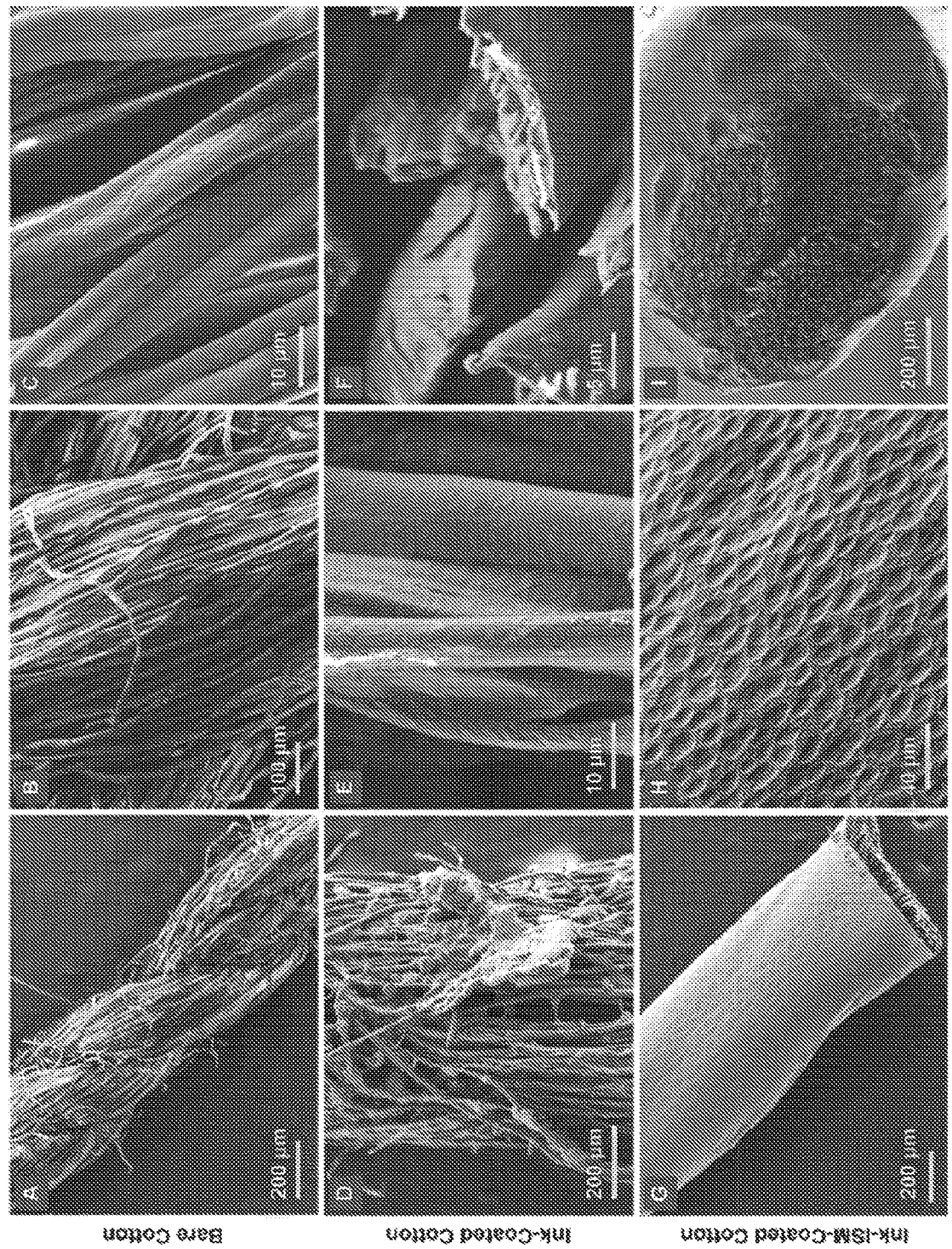
FIGS. 11A-11I show SEM images of different threads before being coated with a conductive coating, after being coated with a conductive coating, and after being coated with an ion-selective membrane in accordance with certain embodiments.
Figures 12A, 12B, 12C, 12D, 12E, 12F:
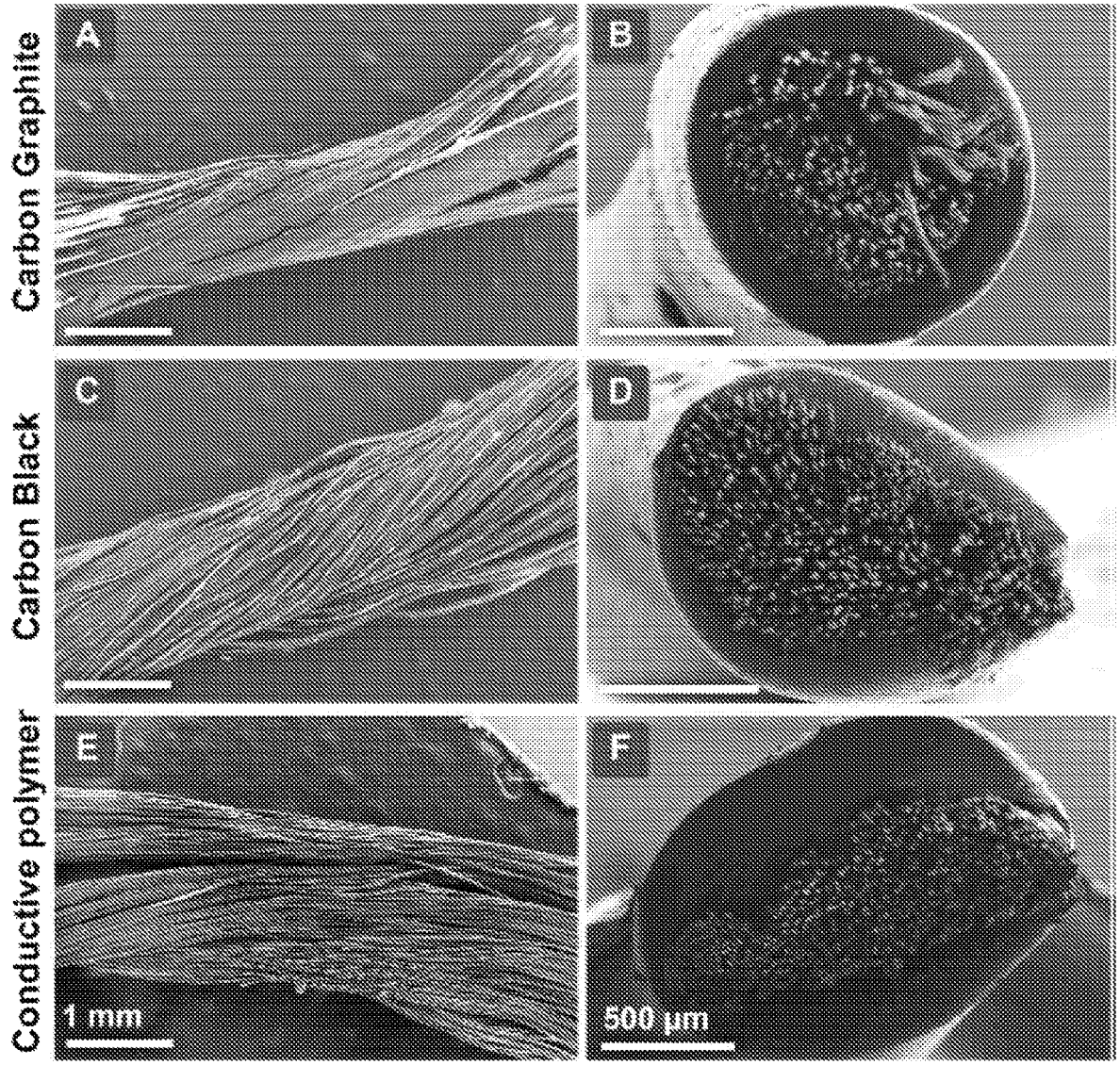
FIGS. 12A-12F show SEM images of different threads coated with a conductive coating in accordance with certain embodiments.

FIGS. 11A-11I show SEM images of bare cotton thread (FIGS. 11A-11C), cotton thread coated with the carbon black ink (FIGS. 11D-11F show the cross-section), and the cotton thread coated with carbon black ink and the ISM (FIGS. 11G-11I show the cross section).

potential (E°) of identically-prepared $K^+$ thread-based ISEs was 23.0 mV for graphite carbon, 3.1 mV for carbon black, and 9.2 mV for the PEDPOT:PSS. These values are similar to the electrode-to-electrode reproducibility in the value of E° of conventional solid-contact ISEs. The electrode-to-electrode reproducibility in the E° of the electrodes affects how the sensors should be calibrated prior to analysis of the sample and is discussed in more detail in the following sections.

To fabricate thread-based ISEs with best performance, ink with carbon black using an organic polymer (PVC+o-NPOE as plasticizer) was developed as the ink binder. This ink has the following advantages: (i) carbon black is porous and has a large ratio of surface area to volume, and high specific capacitance; this high specific capacitance establishes a stable interfacial potential between the ion-to-electron transducer and the ISM, and minimizes the drift in the emf of ISEs with carbon-based materials. (ii) Carbon black is inexpensive and widely available. (iii) Using a plasticized polymer matrix maintains flexibility of the carbon black-polymer composite, and the thread coated with this ink maintains its conductivity after mechanical stress. (iv) The carbon can be mechanically dispersed in the polymer and plasticizer and surfactants were not used in the fabrication. Surfactants could degrade the performance of ISEs. (v) The polymer and plasticizer contain the carbon black particles, adhere well to the thread, and avoid shedding of carbon particles from the ink-coated thread. (vi) The ISM adheres well to the ink-coated thread because the ink has a similar composition to the ISM (both have PVC+o-NPOE as the polymer support). (vii) The ink can be developed with simple equipment (a mortar and pestle) and with different types of carbon if carbon black was not accessible, it thus can be employed for fabrication of thread-based ISEs in resource-limited settings.

To determine the influence of the type of thread on the performance of the ISEs, the response of $K^+$ ISEs made using Nylon, cotton, polypropylene, and polyester threads and carbon graphite ink were measured. As shown in FIG. 10B, all $K^+$ ISEs exhibited Nernstian slope and micro-molar limits of detection. The type of thread did influence the electrode-to-electrode reproducibility in the E° of the sensors. 7.5, 10.0, 23.0, and 29.6 mV reproducibility in the E° of polyester, cotton, Nylon, and polypropylene based $K^+$ ISEs (using carbon graphite as the conductive ink) were observed, respectively. Without wishing to be bound by theory, the different absorption capacity of threads for conductive inks, differences in the mechanics of the interface of the ISM and the ion-to-electron transducer ink on thread, and different hydrophobicity of the types of threads may be contributing factors to explain why the type of thread affects electrode-to-electrode reproducibility in the E° of the ISEs.

Figures 13A, 13B, 13C:
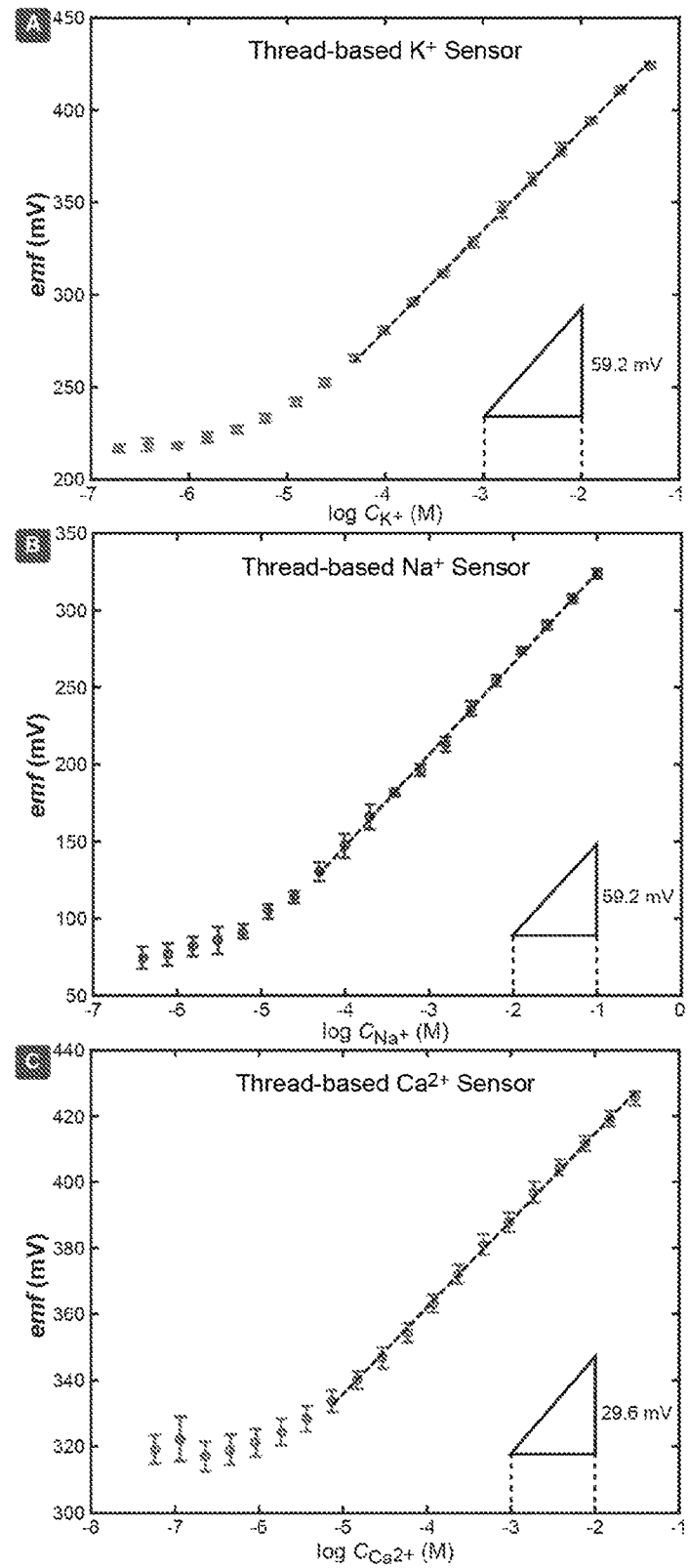
FIG. 13A-C shows the response of thread-based $Na^+$, $K^+$, and $Ca^{2+}$ selective and reference electrode in accordance with certain embodiments.

$Na^+$ and $Ca^{2+}$ Thread-Based ISEs:

To develop ISEs for ions other than $K^+$, the ion receptor (ionophores) in the ISM can be changed. Numerous ionophores for selective binding to several ions have been demonstrated based on the concept of molecular recognition and host-guest chemistry. As an example of ISEs selective to different ions, the response of $Na^+$ and $Ca^{2+}$ ISEs (made from Nylon and carbon graphite ink) are shown in FIGS. 13A-13C. The ISEs exhibited slopes of 63.5±2.7 and 26.9±1.0 mV/decade, respectively, both values are close to the theoretically expected Nernstian slopes of 59.2 and 29.6 mV/decade. In agreement with observation for $K^+$ ISEs made with cotton thread and carbon nanotube ink, the response range and limit of detection of the cation selective thread-based ISEs were comparable to that of conventional solid-contact ISEs.

Figure 16:
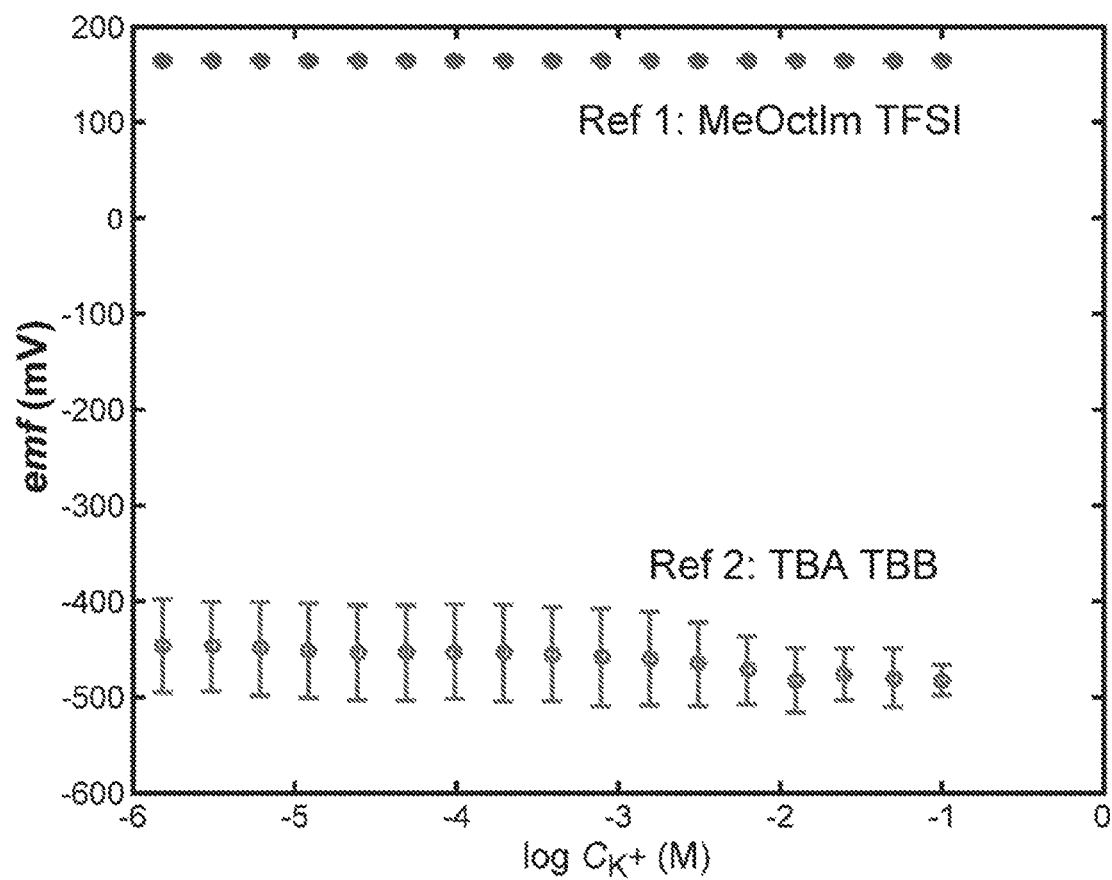
FIG. 16 show the emf of the thread-based reference electrode in solutions with varying concentrations of chloride (KCl). The average and standard deviation of emf of seven identically-prepared thread-based reference electrodes with MeOctIm TFSI-containing membrane and TBA TBB-containing membrane are shown to measure the potential drift in 100 mM KCl.

Reference Electrode:

The response of the thread-based reference electrode relative to a commercial reference electrode in solutions with varying KCl concentrations was measured, as shown in FIG. 16, and it was confirmed that there are minimal changes in the reference potential (slope 0.02±0.04 mV/decade) over six orders of magnitudes. To show a measurement carried out with a full thread-based potentiometric cell, the response of a thread-based $Cl^-$ ISE sensor was measured relative to the thread-based reference electrode in solutions with different $Cl^-$ concentrations and obtained Nernstian response FIG. 17A.

Figure 14:
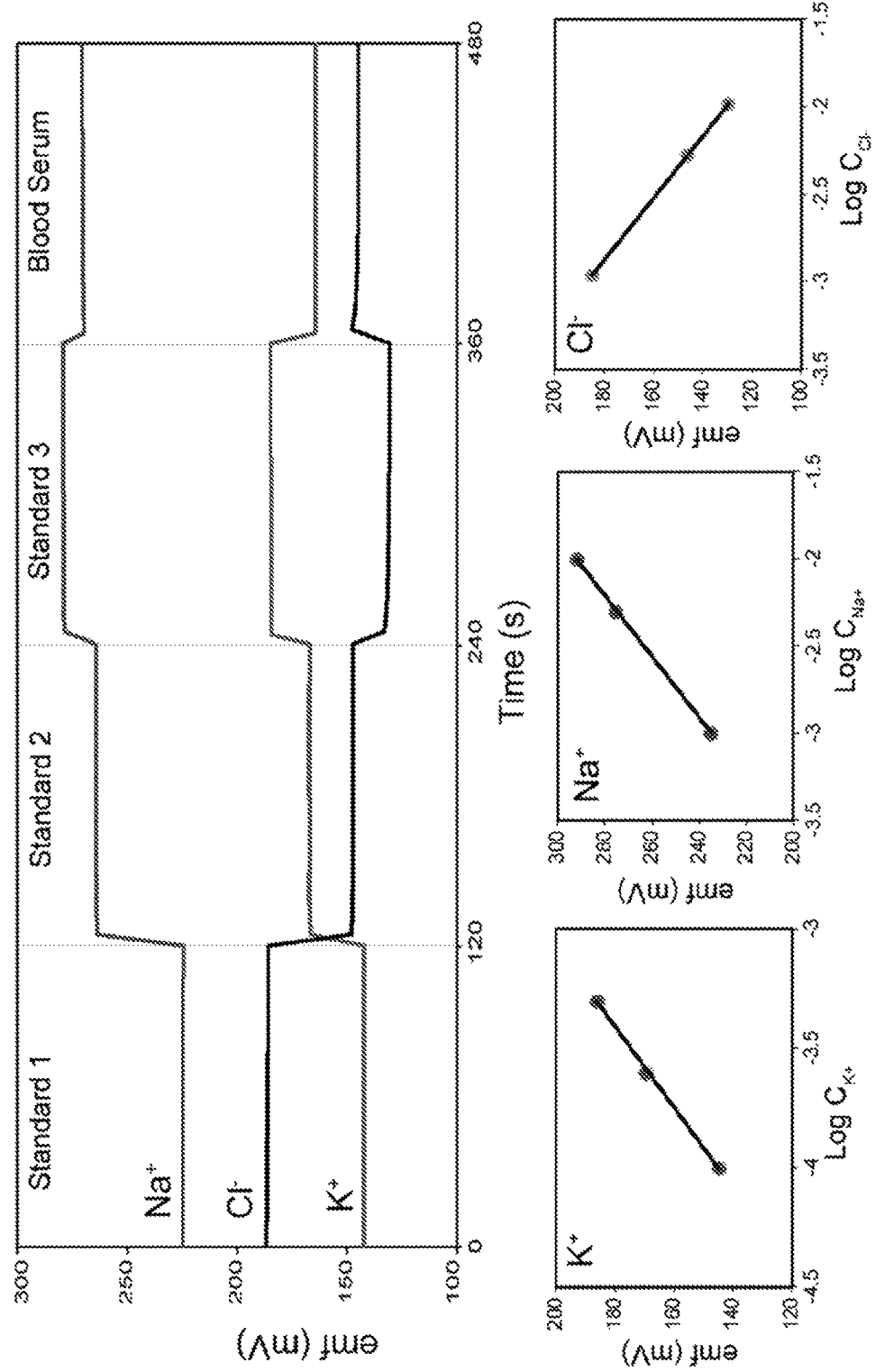
FIG. 14 shows the 3-point calibration of thread-based multiplexed ion sensor and measurement in blood serum.

Measurements in Blood and Urine:

Measurements were performed with thread-based ISEs in diluted urine and errors are calculated based on values obtained with commercial ISEs. Both urine and blood serum were diluted to decrease the ionic strength of the solution and ensure activity and concentration of ions are equivalent in the solution. A bundle containing the reference electrode and $K^+$, $Na^+$, and $Cl^-$ thread-based sensor was made and all three ISEs were simultaneously calibrated. Then, the ISE bundle was dipped in blood serum or urine (FIG. 14). The analysis was completed in less than 10 minutes. The reference electrode has a significant effect on the precision and accuracy of the analysis. Table 2 shows the measurements performed with different thread-based reference electrodes.

TABLE 2

Electrolyte levels in human urine, measured by thread-based ISEs.

|  | $K^+$ | $Na^+$ | $Cl^-$ |
|---|---|---|---|
| Standard ISEs | 41.38 ± 0.71 mM | 101.07 ± 1.19 mM | 124.03 ± 1.95 mM |
| Thread-based Electrode bundle (Ref 1)[a] | 41.31 ± 0.68 mM | 105.07 ± 4.20 mM | 138.83 ± 3.98 mM |
| Thread-based Electrode bundle (Ref 2)[b] | 46.56 ± 4.53 mM | 98.63 ± 7.30 mM | 140.21 ± 6.82 mM |
| Thread-based Electrode bundle (Ref 2)[c] | 48.48 ± 8.94 mM | 116.86 ± 38.08 mM | 98.71 ± 38.61 mM |

Example 2

Materials

The Ag/AgCl ink was purchased from Ercon (Wareham, MA). Carbon black (BP 2000, LOT-3917778) was provided by CABOT (Alpharetta, GA). 1-Methyl-3-n-octylimidazolium bis(trifluoromethylsulfonyl)imide (MeOctIm TFSI), 99%, was purchased from Alfa Aesar. The 2-nitrophenyl octyl ether (o-NPOE, Selectophore grade), high molecular weight poly(vinyl chloride) (PVC, Selectophore grade), tetrabutylammonium tetrabutylborate (TBA TBB), cyclohexanone, and tetrahydrofuran (THF, inhibitor-free, for HPLC, purity ≥99.9%) were purchased from Sigma-Aldrich. Polyolefin heat shrinkable tubing (product of Uxcel), cotton thread (100% mercerized crochet threads, Aunt Lydias Classic 10, product of Coats & Clark), nail polish (Instadri, Sally Hansen), and the Hach Chloride QuanTab test strips (low range and high range) were purchased from Amazon. Polystyrene tipped swabs for applying inks to thread were purchased from Puritan Medical Products. The sand (Quikrete All-purpose sand (50 lb) and soil (Premium Topsoil, Scotts (0.75 cu. ft.)) were bought at Home Depot, Watertown, MA Membrane and Ink Compositions:

Precursor of the reference membrane were prepared by dissolving 100 mg of MeOctIm TFSI or TBA TBB, 600 mg of o-NPOE, and 300 mg of PVC in 2.5 mL of THF. To prepare the carbon black ink, 267 mg of PVC and 534 mg of o-NPOE were dissolved in 1 mL of THE and 2.5 mL of cyclohexanone, and this solution was added to 200 mg of carbon black, and the mixture was grinded (with a mortar and pestle) for five minutes to obtain a homogenous mixture. This ink was applied to the thread immediately after preparation.

Fabrication:

Cotton thread was cut into 8-cm pieces. A polystyrene-tipped swab was used to apply the conductive inks (Ag/AgCl and carbon black) to the thread and the ink was allowed to dry overnight at ambient temperature to generate electrically-conductive thread. Using a brush with a solution of nail polish, 0.5 cm of the Ag/AgC-coated thread was painted with this solution (see FIGS. 2A and 2B), and the nail polish was allowed to dry at ambient temperature for two hours. The Ag—AgCl-coated thread was then inserted into a 7-cm heat-shrinkable tube (made of polyolefin), leaving 0.5 cm of the thread exposed at each end, and a heat gun was used to heat the heat-shrinkable tube for 10-15 s to form a tight fit around the thread.

To fabricate the thread-based reference electrode, one end of the carbon black-coated thread was attached to a paper clip, 3-cm of the other end of the thread was dipped into the precursor of the reference membrane, and the thread was hung vertically to allow the solvent (THF) to evaporate and to allow the membrane to set overnight at room temperature. The thread was then inserted into a 7-cm heat-shrinkable tube, leaving 0.5 cm of thread exposed at each end, and used a heat gun to heat the heat-shrinkable tube for 10-15 s to form a tight fit around the thread.

Measurements:

Unless noted otherwise, the response of the sensors were measured (measurements on seven identically-prepared electrodes) at room temperature with respect to a free-flow double-junction AgCl/Ag reference electrode (with a movable ground glass sleeve junction, 1.0 M lithium acetate bridge electrolyte) purchased from Mettler Toledo. 20 g of each soil sample was washed with one liter of deionized water, placed in an oven (130° C.) for one hours to dry, and the soil was left to reach to room temperature. 2.0 g of soil was measured and 5 mL of aqueous chloride containing solution (100 mM, 10 mM, and 1 mM KCl) (aq) was added to the soil, and the mixture was kept in a closed container overnight before the measurement. The aqueous solution in contact with the soil was filtered, and the amount of chloride was measured with the Hach Chloride test strips according to the instructions provided by the manufacturer. For measurements with the thread-based sensor, a bundle of the thread-based reference electrode and Ag/AgCl-coated thread was made, this bundle was placed in the aqueous solution that was in contact with the soil (without any filtration), and the emf of the cell was recorded after two minutes. This process was repeated for the unwashed soil.

Results and Discussion

Potentiometry is commonly used in research and test laboratories for detection of ions in complex matrices. In this technique, the electrical potential of an indicator electrode (an ion-selective electrode, or ISE) provides a quantitative measurement of the activity of the analyte. This potential (referred to as electromotive force or emf) is measured with respect to a reference electrode that maintains a constant and sample-independent potential throughout the experiment. The relationship between the emf and the activity of the analyte is described by the Nernst equation (emf=E°+(RT/zF) In a), where E° represents the standard potential, R the universal gas constant, T the temperature, F the Faraday constant, z the charge, and a the activity of the ion. An order of magnitude change in the activity of the ion with charge z, results in 59.2 mV/z change in the potential of the ISE.

Figures 15A, 15B, 15C:
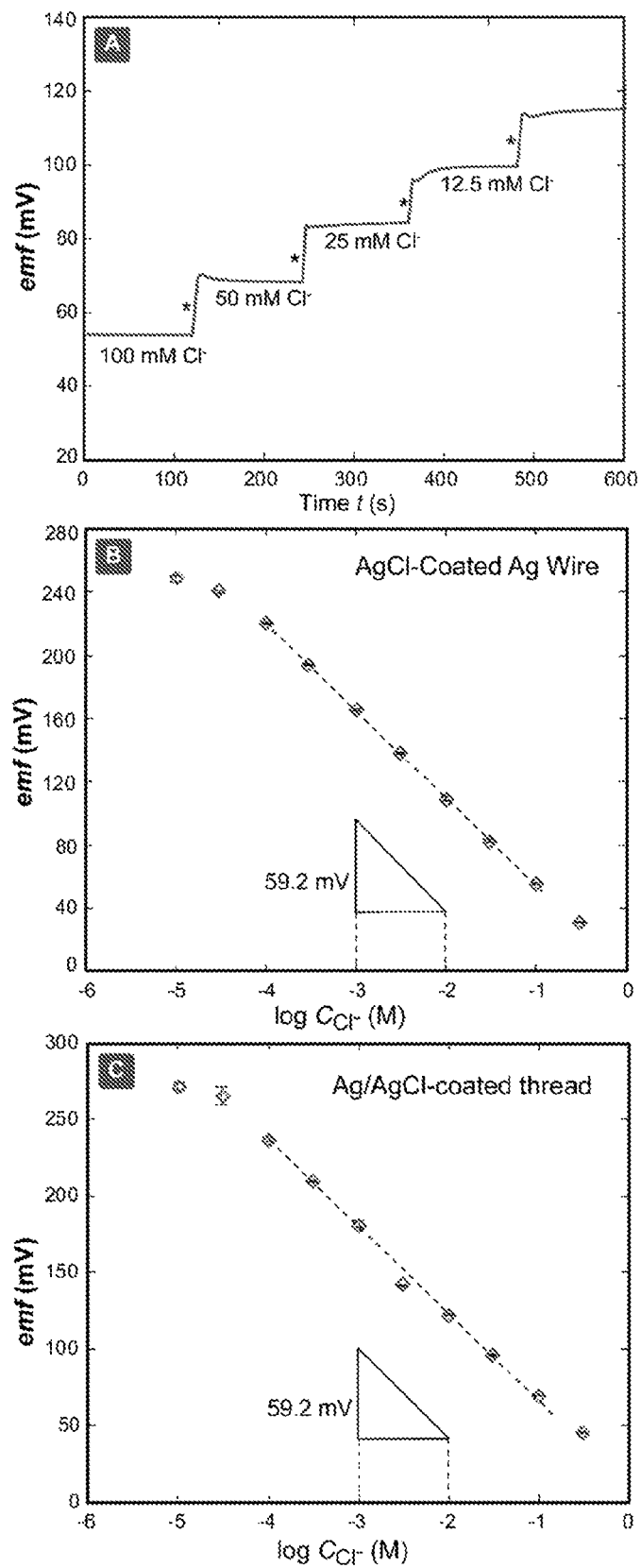
FIG. 15A shows the response of a thread-based $Cl^-$ sensor in solutions with varying $Cl^-$ concentrations.
FIGS. 15B and 15C show the theoretically-expected Nernstian behavior of AgCl-coated Ag wire and Ag/AgCl-coated cotton thread, along with the average and standard deviation of emf of seven identically-prepared electrodes.

Chloride Sensing:

Chloride sensing can be accomplished by using the redox system of $Ag_{(s)}/AgCl_{(s)}/Cl^-_{(aq)}$, where the electrical potential of Ag/AgCl is determined by the activity of chloride ions in the sample. FIG. 15A shows the emf of an AgC-coated Ag wire in solutions with different concentrations of chloride and FIG. 15B shows the theoretically-expected linear relationship of the emf and the logarithm of activity of chloride. Incorporation of Ag/AgCl in thread allows the sensor to be used conveniently as a dip stick device, while maintaining the low-cost, portability, and light weight of the sensor. The spaces between the fibers comprising the thread can contain conductive inks, while the thread provides mechanical support for the sensor. Thread can also be used as a substrate to contain the Ag/AgCl ink.

Ag/AgCl ink was used on different types of thread (cotton, Nylon, and polypropylene) to develop thread-based sensors for Cl⁻. The resistance of the threads saturated with Ag/AgCl was measured to ensure conductivity over the length of the thread (obtained resistances of less than 10 Ω/cm for all types of thread. A nail polish solution was applied to thread as a wicking barrier to ensure that when this sensor is placed in an aqueous solution, the solution does not wick up to the other end of the thread and interfere with the measurement of electrical potential. Nail polish was used because it is hydrophobic, inexpensive, widely available, and adheres well to the thread. Nail polish can be replaced with other solutions of hydrophobic polymers.

The ink-coated thread (that contain the wicking barrier) was then enclosed in a heat-shrinkable tubing, leaving 0.5 cm of thread exposed at each end (for contact with the sample, and for electrical connection). Heat-shrinkable tubing was used as an electrical insulator and a physical barrier (to avoid short-circuits) when the thread-based Cl⁻ ISE is bundled with the reference electrode. The area of the surface of the thread coated with Ag/AgCl ink that is exposed to sample does not affect the potentiometric measurement, and the contact area of 5 mm was chosen simply for convenience in the fabrication process. The response of thread-based Cl⁻ ISEs was measured relative to a commercial reference electrode; a stable potential (less than 0.1 mV/min drift) was obtained approximately 100 s after exposing the sensor to Cl⁻ containing solutions. Thread-based Cl⁻ ISEs have a function that is similar to an AgCl-coated Ag wire and exhibited Nernstian slope in a range of 100 mM to 0.1 mM Cl⁻. FIG. 15C shows the response of cotton-based Cl⁻ ISE. 0.5 mV or better electrode-to-electrode reproducibility was obtained in the potential of the thread-based Cl⁻ ISEs. No significant differences between the performance of thread-based Cl⁻ ISE made of cotton, Nylon, and polypropylene were observed. The response to Cl⁻ was determined more by the properties the Ag/AgCl ink than by the material comprising the thread. Cotton thread was used for the measurements beyond this point because cotton was available in smaller dimensions and it absorbed the Ag/AgCl ink more homogenously than the Nylon and polypropylene thread.

Reference Electrode:

Most commercial reference electrodes function based on the redox system of $Ag_{(s)}/AgCl_{(s)}/Cl^-_{(aq)}$. The Ag/AgCl electrode (typically as a silver wire coated with silver chloride) is immersed in a reference solution with high concentration of $Cl^-$, and the reference and sample solutions contact though a junction that maintains a small flow of the reference solution into the sample solution. This design allows electrical contact between the two solutions but avoids significant mixing of the two solutions (porous glass frits and glass sleeve junctions are the two commonly adopted junction types). Such design for the reference electrode is not suitable for ion sensing in the field because it requires maintenance of the reference solution, and protection of a complicated glass junction; both of which increase the cost of the electrode and decrease the convenience of its use.

To develop a portable, light, and easy-to-use reference electrode, the ion-selective membrane was replaced with a reference membrane (see FIGS. 4A and 4B). We enclose the thread-based reference electrode in a heat-shrinkable tubing to seal the bare ink-coated thread (leaving only 0.5 cm exposed at the other of the thread for connection to the potentiometer), and to avoid short-circuit when the reference electrode is bundled with the thread-based $Cl^-$ ISE. The reference membrane consists of a polymer and plasticizer (PVC and o-NPOE), and a hydrophobic electrolyte that slowly and continuously leaches out to the solution (see FIG. 4B). The amount of leaching is small enough that it does not significantly change the activity of the hydrophobic electrolyte in the membrane, but large enough to maintain a constant activity of electrolytes at the interface of the reference membrane/sample. The distribution of the hydrophobic electrolyte between the reference membrane and sample solution defines the reference potential.

This referencing system does not need chloride-containing reference solutions or complicated junctions, does not contaminate the sample by diffusion and leakage of KCl from the reference solution, and does not require maintenance of the reference solution, it thus allows fabrication of reference electrodes that are suitable for in-field analyses. Use of the two hydrophobic electrolytes tetrabutylammonium tetrabutylborate (TBA TBB) and 1-Methyl-3-n-octyl-imidazolium bis(trifluoromethylsulfonyl)imide (MeOctIm TFSI) to develop solid-contact reference electrodes were suggested. FIG. 16 shows the electrical potential of the thread-based reference electrodes was measured with reference membranes containing MeOctIm TFSI and TBA TBB relative to a commercial reference electrode in solutions with different concentrations of $Cl^-$ (over six orders of magnitude). FIG. 16 shows that there are minimal changes in the reference potential as the concentration of $Cl^-$ is altered in the solution.

Figures 17A, 17B, 17C:
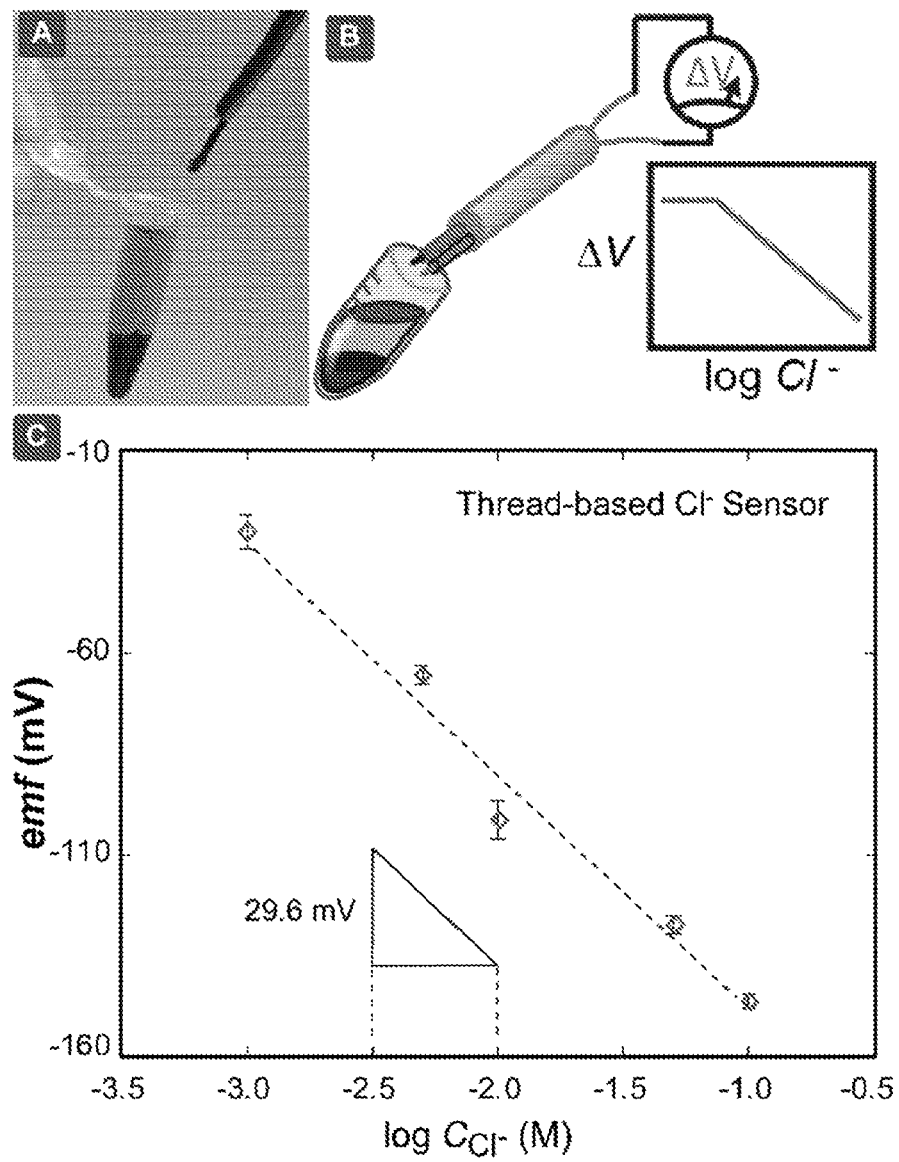
FIGS. 17A and 17B show the thread-based $Cl^-$ sensor to be immersed in the soil and water slurry for signal readout.
FIG. 17C shows the Nernstian relationship of the emf and the logarithm of concentration of chloride and shows the response of a thread-based $Cl^-$ sensor measured with respect to a thread-based reference electrode in solutions with varying Cl⁻ concentrations. Each data point shows the average of three measurements made with three disposable sensors.

Application of the Thread-Based $Cl^-$ Sensor for Analysis of Chloride in Soil:

FIGS. 17A and 17B show the thread-based $Cl^-$ sensor consisting of the thread-based reference electrode (membrane containing MeOctIm TFSI) and the thread-based $Cl^-$ ISE. The thread-based sensor is compact and portable and can detect chloride in sample volumes as low as 200 μL by simply immersing it in the sample solution and recording the potential difference between the ISE and the reference electrode (the emf). The sensor can be disposed of by incineration. FIG. 17C shows the relationship between the emf of the thread-based sensor and the concentration of chloride in solution. To confirm that the sensor can accurately determine chloride levels in soil, the soil was washed with deionized water, and immersed in a solution with known concentrations of chloride. The thread-based sensor was dipped in the slurry of the soil and aqueous solution and the emfwas recorded after two minutes. Table 3 lists the results and demonstrates that the thread-based potentiometric sensor provides results with similar precision and accuracy as the commercial dip stick colorimetric test strip.

TABLE 3

Concentration of chloride in aqueous solutions in contact with sand and soil determined by the thread-based $Cl^-$ sensor and the commercial colorimetric chloride test strips. We show the average of three measurements. We calculated the error as $(C_{determined} - C_{known})/C_{known}$.

| | Thread-based $Cl^-$ Sensor | | Commercial Chloride Test Strips | |
|---|---|---|---|---|
| | Concentration (mg/L) | Percent Error | Concentration (mg/L) | Percent Error |
| Sand in contact with 100 mM (3500 mg/L) $Cl^-$ (aq) | 3479 ± 99 | −2.0 | 3266 ± 300 | −8.0 |
| Sand in contact with 10 mM (350 mg/L) $Cl^-$ (aq) | 389 ± 23 | 9.6 | 364 ± 25 | 2.7 |
| Sand in contact with 1 mM (35 mg/L) $Cl^-$ (aq) | 42 ± 7 | 12.8 | 37 ± 3 | 3.3 |
| Soil in contact with 100 mM (3500 mg/L) $Cl^-$ (aq) | 3150 ± 90 | −11.3 | 3360 ± 183 | −5.4 |
| Soil in contact with 10 mM (350 mg/L) $Cl^-$ (aq) | 348 ± 12 | −1.9 | 337 ± 23 | −5.2 |
| Soil in contact with 1 mM (35 mg/L) $Cl^-$ (aq) | 41.4 ± 11 | 16.7 | 44 ± 4 | 23.9 |
| Sand in contact with unknown amount of $Cl^-$ (aq) | 1495 ± 55 | — | 1694 ± 81 | — |
| Soil in contact with unknown amount of $Cl^-$ (aq) | 221 ± 13 | — | 195 ± 20 | — |

The thread-based Cl⁻ sensor and the commercial chloride test strip determined similar values of chloride in the aqueous solution in contact with unwashed soil and sand. The thread-based Cl⁻ potentiometric sensor can be paired with an inexpensive, portable, and web-connected electrochemical reader for convenient application in the field.

Example 3

Analysis of $K^+$, $Na^+$, and $Ca^{2+}$ in Food and Dietary Supplements

To demonstrate an application of thread-based ISEs, $K^+$ and $Na^+$ in coconut water (advertised as a good source of electrolytes and suitable for hydration) were detected with the following protocol. A $K^+$ and a $Na^+$ sensor was randomly picked from a batch of sensors, calibrated them to determine the equation for conversion of the emf to the concentrations of $K^+$ and $Na^+$, and then the emf of these sensors and three additional $K^+$ and $Na^+$ sensors (which were not calibrated and were from the same batch) were measured in coconut water. The sensors that were not calibrated prior to the analysis resulted in a $K^+$ concentration of 34±3 mM and a $Na^+$ concentration of 19±1 mM. These values were close to the concentrations measured by the sensors that were calibrated (37 mM $K^+$ and 18 mM $Na^+$). The label of the juice specified that the product contained 470 mg potassium and 70 mg sodium in 240 mL (one serving) which is equivalent to 50 mM $K^+$ and 12 mM $Na^+$, and is in agreement with the concentrations determined by the thread-based ISEs.

To measure $Ca^{2+}$ in a calcium dietary supplement (the product label specified that each pill contained 500 mg of calcium), the $Ca^{2+}$ thread-based ISE was used with the same calibration protocol as above (calibrate a representative sensor to determine the calibration equation, use a different sensor for the measurement in sample), and obtained 442±76 mg for the amount of calcium in each pill. These demonstrations show that calibration of each individual sensor is not required in field use for applications that can tolerate approximately 10% error in the analysis.

What is claimed is:

1. A bundle containing a plurality of ion-sensing electrodes,
    wherein each ion-sensing electrode comprises:
        at least one thread, each thread comprising a plurality of fibers;
        a conductive coating covering at least a portion of the thread, wherein the conductive coating comprises a conducting polymer or a conducting material that includes a material that is similar to a target ion to be sensed in a test solution;
        a barrier material covering at least a portion of the conductive coating, wherein said barrier material reduces passage of the test solution past the barrier material; and
    wherein each ion-sensing electrode is selective to a different target ion.

2. The bundle of claim 1, wherein the thread comprises nylon, polyester, polypropylene, or combinations thereof.

3. The bundle of claim 1, wherein the conductive coating comprises a conducting polymer and one or more conductive particles.

4. The bundle of claim 1, wherein the barrier material comprises one of a hydrophobic polymer, an epoxy resin, a curable gel, nail polish, or a combination thereof.

5. The bundle of claim 1, wherein one or more of the plurality of ion-sensing electrodes comprises an insulating sheath covering at least a portion of the thread.

6. The bundle of claim 5, wherein the insulating sheath comprises a hydrophobic polymer or a heat curable tubing.

7. A bundle containing a plurality of ion-sensing electrodes and a reference electrode,
    wherein each ion-sensing electrode comprises:
        at least one thread, each thread comprising a plurality of fibers;
        a conductive coating covering at least a portion of the thread, wherein the conductive coating comprises a conducting polymer or a conducting material that includes a material that is similar to a target ion to be sensed in a test solution;
        a barrier material covering at least a portion of the conductive coating and the ion selective membrane, wherein said barrier material reduces passage of the test solution past the barrier material;
    wherein each ion-sensing electrode is selective to a different target ion; and
    wherein the at least one reference electrode comprises:
        at least one reference thread, each reference thread comprising a plurality of reference fibers;
        a reference conductive coating covering at least a portion of the reference thread, wherein the reference conductive coating comprises a reference conducting polymer;
        a reference membrane covering at least a portion of the reference conductive coating, wherein the reference membrane comprises an ionic liquid or an electrolyte that leaches out to the test solution to create a sample-independent constant reference potential; and
        a reference barrier material covering at least a portion of the reference conductive coating and the reference membrane, wherein said reference barrier material reduces passage of the test solution past the reference barrier material.

8. The bundle of claim 7, wherein the reference membrane further comprises a polymer.

9. The bundle of claim 8, wherein the polymer is a plasticized polymer.

10. The bundle of claim 7, wherein one or more of the thread and the reference thread comprises nylon, polyester, polypropylene, or combinations thereof.

11. The bundle of claim 7, wherein one or more of the conductive coating and the reference conductive coating comprises a conducting polymer and one or more conductive particles.

12. The bundle of claim 7, wherein one or more of the barrier material and reference barrier material comprises a hydrophobic polymer, an epoxy resin, a curable gel, nail polish, or a combination thereof.

13. The bundle of claim 7, wherein each ion-sensing electrode further comprising an insulating sheath covering at least a portion of the thread, and wherein the reference electrode further comprises a reference insulating sheath covering at least a portion of the thread.

14. The bundle of claim 13, wherein one or more of the insulating sheath and the reference insulating sheath comprises a hydrophobic polymer or a heat curable tubing.

15. A potentiometric cell comprising the bundle claimed in claim 7, and a meter to detect the difference in voltage between the each ion-sensing electrode and the reference electrode.

16. The bundle of claim 1, wherein the conductive coating comprises a conducting polymer.

17. The bundle of claim 1, wherein the conductive coating comprises a component of the redox system of the target ion.

18. The bundle of claim 1, wherein each ion-sensing electrode comprises an ion selective membrane covering at least a portion of the conductive coating.

19. The bundle of claim 18, wherein the barrier material covers at least a portion of the ion selective membrane.

20. A potentiometric cell comprising the bundle claimed in claim 1, a reference electrode, and a meter to detect the difference in voltage between each ion-sensing electrode and the reference electrode.

21. The of claim 18, wherein the ion selective membrane comprises a polymer, an ionophore that binds to the target ion to be sensed in the test solution, and a hydrophobic ion with a charge opposite to the target ion.

22. The bundle of claim 21, wherein the polymer is a plasticized polymer.

* * * * *